US011303225B2

(12) United States Patent
Maeda et al.

(10) Patent No.: US 11,303,225 B2
(45) Date of Patent: Apr. 12, 2022

(54) ELECTROSTATIC MOTOR

(71) Applicant: CITIZEN WATCH CO., LTD., Tokyo (JP)

(72) Inventors: Toshinari Maeda, Saitama (JP); Akira Izumi, Tokyo (JP)

(73) Assignee: CITIZEN WATCH CO., LTD., Tokyo (JP)

(*) Notice: Subject to any disclaimer, the term of this patent is extended or adjusted under 35 U.S.C. 154(b) by 41 days.

(21) Appl. No.: 16/495,385

(22) PCT Filed: Mar. 22, 2018

(86) PCT No.: PCT/JP2018/011142
§ 371 (c)(1),
(2) Date: Sep. 18, 2019

(87) PCT Pub. No.: WO2018/174077
PCT Pub. Date: Sep. 27, 2018

(65) Prior Publication Data
US 2020/0076327 A1 Mar. 5, 2020

(30) Foreign Application Priority Data
Mar. 22, 2017 (JP) .............................. JP2017-056120

(51) Int. Cl.
H02N 1/00 (2006.01)
(52) U.S. Cl.
CPC .................................. H02N 1/004 (2013.01)
(58) Field of Classification Search
CPC ........... H02N 1/00; H02N 1/002; H02N 1/004
(Continued)

(56) References Cited

U.S. PATENT DOCUMENTS 3,696,258 A * 10/1972 Anderson .............. H02N 1/004
310/308
4,814,657 A * 3/1989 Yano ....................... H02N 1/08
310/309
(Continued)

FOREIGN PATENT DOCUMENTS

JP    S56-44389 A    4/1981
JP    H04-112683 A   4/1992
(Continued)

OTHER PUBLICATIONS

English machine translation, Suzuki (JP 2003-224985) (Year: 2003).*
(Continued)

Primary Examiner — Burton S Mullins

(57) ABSTRACT

Provided is a small-sized electrostatic motor having a rotor capable of starting reliably to rotate forward. The electrostatic motor includes a rotor rotatable around a rotating shaft, charged portions formed radially around the rotating shaft on upper and lower surfaces of the rotor, first and second stators disposed to sandwich the rotor therebetween, and first sets and second sets of fixed electrodes respectively formed radially around the rotating shaft on the surfaces of the first and second stators facing the rotor and selectively energized according to drive pulses to rotate the rotor by electrostatic force generated between the charged portions and the fixed electrodes. The average number of sets of fixed electrodes simultaneously energized in one cycle of the drive pulses out of the first sets and second sets of fixed electrodes is equal to the average of the numbers of first sets and second sets of fixed electrodes.

10 Claims, 22 Drawing Sheets

(58) Field of Classification Search
USPC .................................. 310/300, 309; 318/116
See application file for complete search history.

(56) References Cited

U.S. PATENT DOCUMENTS

| | | | |
|---|---|---|---|
| 7,166,951 B2* | 1/2007 | Koga ..................... | H02N 1/004 |
| | | | 310/309 |
| 7,332,847 B2* | 2/2008 | Matsuki ................ | H02N 1/004 |
| | | | 310/309 |
| 2017/0141701 A1* | 5/2017 | Rhee ....................... | H02N 1/08 |

FOREIGN PATENT DOCUMENTS

| | | | | |
|---|---|---|---|---|
| JP | 2003-224985 A | | 8/2003 | |
| JP | 2007-143299 A | * | 6/2007 | ............... H02N 1/00 |
| JP | 2015-012791 A | * | 7/2013 | ............... H02N 1/00 |
| JP | 2015-12791 A | | 1/2015 | |
| JP | 2015-15881 A | | 1/2015 | |

OTHER PUBLICATIONS

English machine translation, Kosho (JP 2007-143299) (Year: 2007).*
WIPO, International Search Report for International Patent Application No. PCT/JP2018/011142, dated Jun. 12, 2018.
WIPO, Written Opinion for International Patent Application No. PCT/JP2018/011142, dated Jun. 12, 2018.

* cited by examiner

FIG. 2
(A)
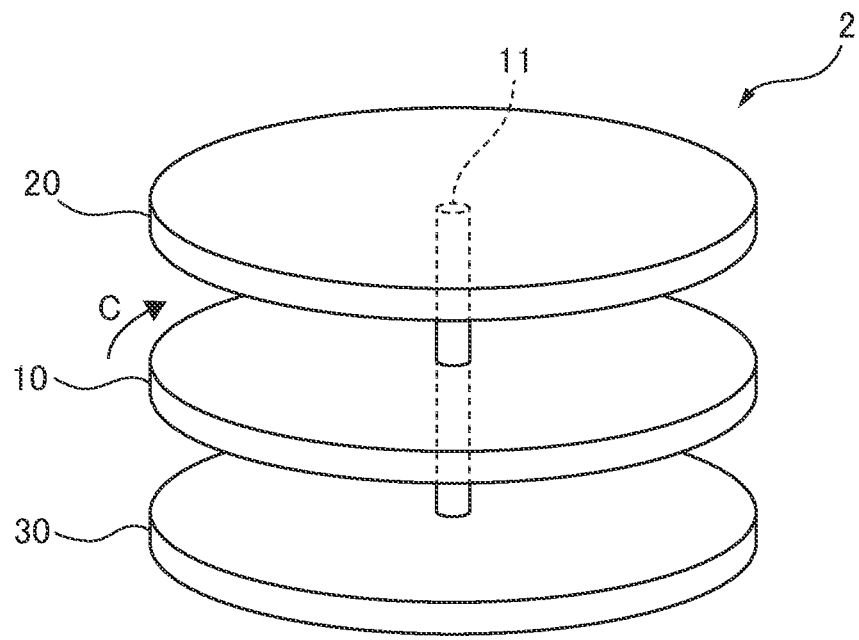
(B)
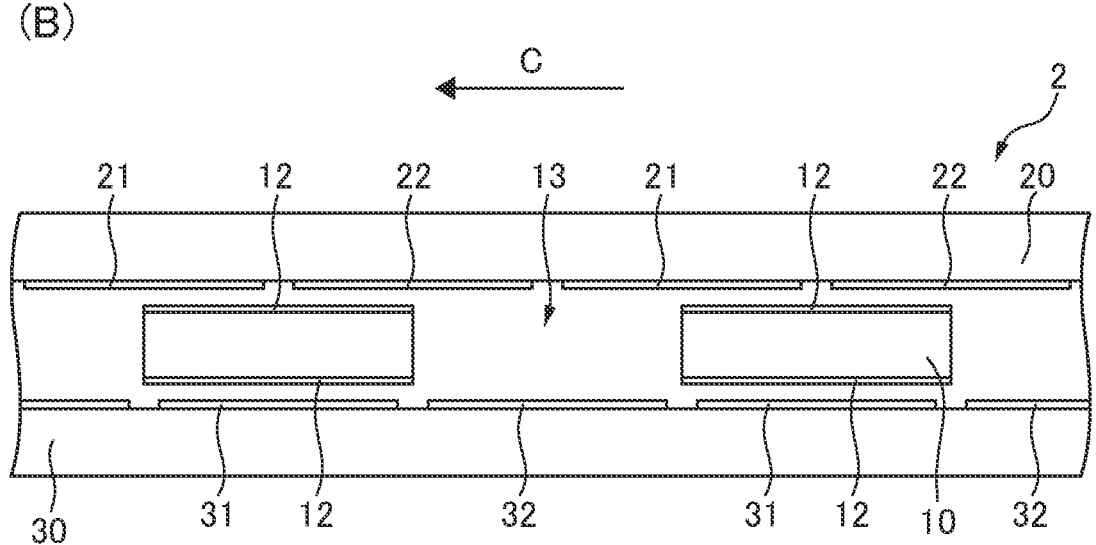

FIG. 15
(A)
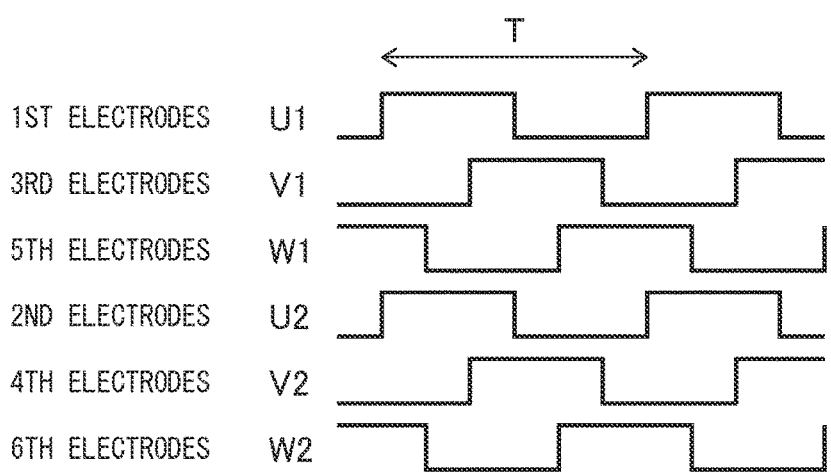
(B)
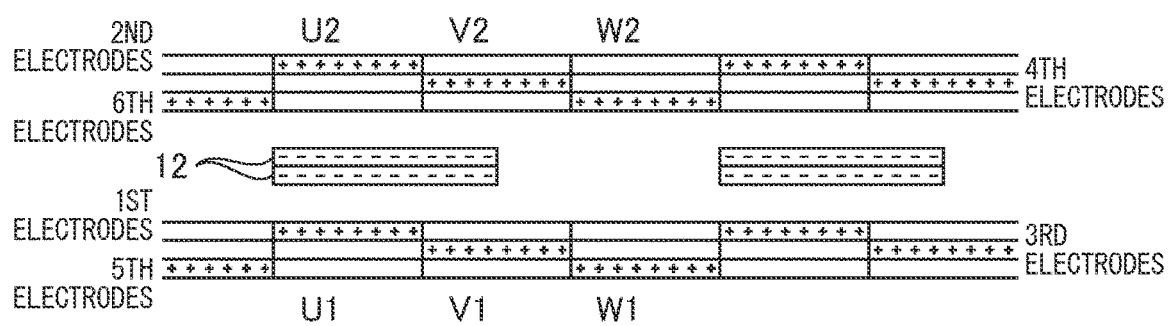

ELECTROSTATIC MOTOR

FIELD

The present invention relates to an electrostatic motor.

BACKGROUND

Patent Literature 1 describes an electrostatic actuator including: a stator having an insulating substrate on which insulated electrodes are formed at predetermined intervals; a mover placed on the stator so as to face the insulating substrate and having permanently polarized dielectric regions on a surface facing the insulating substrate, the dielectric regions disposed at intervals corresponding to those of the electrodes; and a driving means for applying a multiphase voltage to the electrodes so as to form an electric field for moving the mover between the electrodes and dielectric regions facing each other.

Patent Literature 2 describes an electrostatic motor including a stator having n(≥3)-phase-driven electrodes, and a rotor disposed to face the stator and having unipolar electrodes. This electrostatic motor is started by applying a voltage to any one pole of the stator and then to another pole adjacent thereto and thereby aligning the electrodes of the rotor with those of a specific pole of the stator.

CITATION LIST

Patent Literature

Patent Literature 1: Japanese Unexamined Patent Publication No. 4-112683
Patent Literature 2: Japanese Unexamined Patent Publication No. 2015-12791

SUMMARY

On starting an electrostatic motor, although the stopping position of rotor electrodes relative to stator electrodes is generally unknown, it is necessary to start the rotor reliably to rotate forward, regardless of the position of rotor electrodes. Since a small-sized electrostatic motor producing sufficient driving force (torque) is desired for application to electronic appliances, it is desired to reduce frictional resistance in the direction of the rotating shaft to increase driving force in the rotating direction, while the outer diameter of the rotor is kept small.

It is an object of the present invention to provide a small-sized electrostatic motor having a rotor capable of starting reliably to rotate forward.

Provided is an electrostatic motor including: a rotor rotatable around a rotating shaft; charged portions formed radially around the rotating shaft on upper and lower surfaces of the rotor; first and second stators disposed to sandwich the rotor therebetween; and first sets and second sets of fixed electrodes respectively formed radially around the rotating shaft on the surfaces of the first and second stators facing the rotor, the first sets and second sets of fixed electrodes selectively energized according to drive pulses to rotate the rotor by electrostatic force generated between the charged portions and the fixed electrodes, wherein the average number of sets of fixed electrodes simultaneously energized in one cycle of the drive pulses out of the first sets and second sets of fixed electrodes is equal to the average of the numbers of first sets and second sets of fixed electrodes.

Preferably, in the electrostatic motor, on starting the rotor, the first sets and second sets of fixed electrodes are supplied for at least first one cycle with drive pulses having a frequency not more than a product of a predetermined factor and the frequency of drive pulses applied during rotation of the rotor, and the predetermined factor is the reciprocal of a number obtained by subtracting one from the number of rising edges to a positive potential in one cycle of the drive pulses.

Preferably, in the electrostatic motor, the first sets and second sets of fixed electrodes each comprise two to four sets of fixed electrodes, and the range of each of the charged portions in the rotating direction of the rotor overlaps two to eight fixed electrodes out of the first sets and second sets of fixed electrodes.

Preferably, in the electrostatic motor, the first sets and second sets of fixed electrodes are equal in number and displaced out of phase with each other in the rotating direction of the rotor.

Preferably, in the electrostatic motor, the first sets and second sets of fixed electrodes differ in number.

Preferably, in the electrostatic motor, the first sets and second sets of fixed electrodes are concentrically disposed around the rotating shaft, and at least part of one of the first and second stators has a smaller outer diameter than the rotor.

Preferably, the electrostatic motor further includes a driver applying the drive pulses to the first sets and second sets of fixed electrodes, and a controller switching the drive pulses after starting the rotor from starting pulses applied on starting the rotor to low-power pulses consuming less power than the starting pulses.

Preferably, the electrostatic motor further includes a detector detecting rotation of the rotor, wherein the controller switches the drive pulses from the starting pulses to the low-power pulses when it is determined that the rotation of the rotor has been stabled based on a detection result by the detector.

Preferably, in the electrostatic motor, the low-power pulses have energizing periods during which some of the first sets and second sets of fixed electrodes are energized, and non-energizing periods during which none of the first sets and second sets of fixed electrodes is energized and the rotor is rotated by inertia.

Preferably, in the electrostatic motor, the low-power pulses cause only one of the first sets and second sets of fixed electrodes to be energized.

The electrostatic motor can be reduced in size and reliably start the rotor to rotate it forward.

BRIEF DESCRIPTION OF DRAWINGS

FIGS. 2(A) and 2(B) are a schematic perspective and a side view of the actuator 2.

FIG. 15 (A) shows an example of the drive pulses for the actuator 2D, while FIG. 15(B) shows the positional relationship between the charged portions 12 of the rotor 10 and the fixed electrodes.

DESCRIPTION OF EMBODIMENTS

Hereinafter, with reference to the accompanying drawings, an electrostatic motor will be explained in detail. However, note that the present invention is not limited to the drawings or the embodiments described below.

Figure 1:
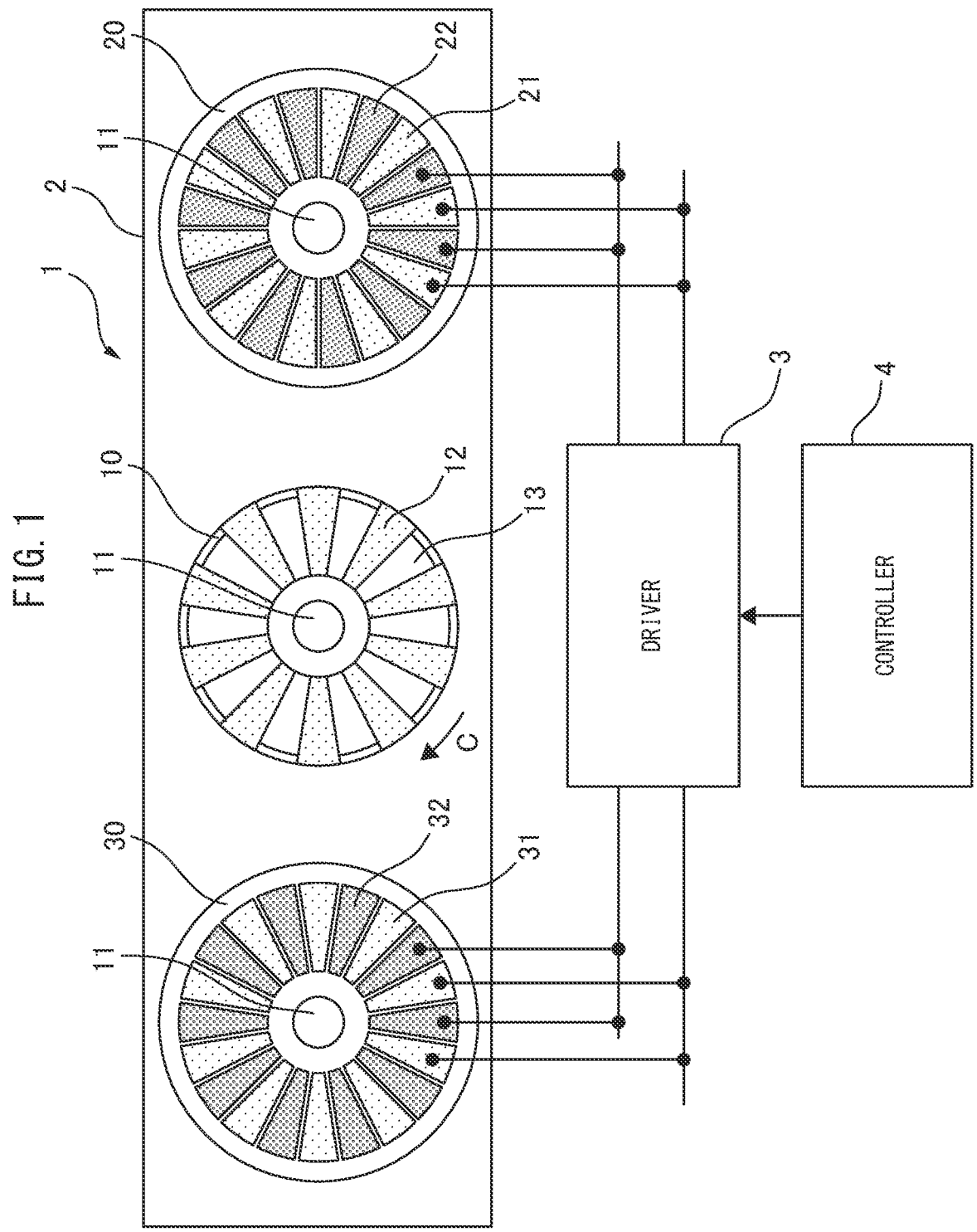
FIG. 1 is a diagram schematically illustrating an electrostatic motor 1.

FIG. 1 is a diagram schematically illustrating an electrostatic motor 1. The electrostatic motor 1 includes an actuator 2, a driver 3 and a controller 4. FIGS. 2(A) and 2(B) are a schematic perspective and a side view of the actuator 2, respectively. Major components of the actuator 2 include a rotor 10, a rotating shaft 11, charged portions 12, stators 20, 30 and sets of fixed electrodes 21, 22, 31, 32. The electrostatic motor 1 generates electrostatic force between the charged portions 12 and fixed electrodes 21, 22, 31, 32 based on electric signals inputted to the driver 3, to rotate the rotor 10, thereby taking out motive power from electric power.

As shown in FIG. 2(A), the actuator 2 is constructed by sandwiching the rotor 10 between the two stators 20, 30. Certain gaps are provided between the stator 20 and rotor 10 and between the rotor 10 and stator 30. For simplicity, FIG. 2(B) shows a side view modified so that the lateral direction of the figure corresponds to the circumferential direction (direction of arrow C in FIG. 2(A)) of the rotor 10 and stators 20, 30. The fixed electrodes 21, 22 are formed on the lower surface of the upper stator 20, while the fixed electrodes 31, 32 are formed on the upper surface of the lower stator 30. In FIG. 1, the stator 20, rotor 10 and stator 30 viewed from above are arranged side by side; the stator 20 is shown as being transparent. The same holds true for other actuators shown in FIGS. 5, 8, 11, 14 and 21 described later.

The rotor 10 is made of a well-known substrate material, such as a silicon substrate, a glass epoxy substrate having electrodes for being charged, or an aluminum plate, which is of low specific gravity. As shown in FIG. 2(A), the rotor 10 has a disk shape, for example, and is fixed at its center to the rotating shaft 11. As shown in FIGS. 1 and 2(B), on the upper and lower surfaces of the rotor 10, the substantially trapezoidal charged portions 12 are radially formed and evenly spaced in the circumferential direction around the rotating shaft 11. For weight reduction, the rotor 10 has substantially trapezoidal through holes (slits) 13 alternating with the charged portions 12 in the circumferential direction. The rotor 10 can be rotated around the rotating shaft 11 in the direction of arrow C (clockwise) and the opposite direction (anticlockwise) by electrostatic force generated between the charged portions 12 and fixed electrodes 21, 22, 31, 32 in response to electric signals inputted to the driver 3.

Even if the rotor 10 has a large diameter and thus large charged areas so as to have a large amount of electrostatic charge, the through holes 13 allow for reducing the weight of the rotor 10, which has the advantage of reducing driving energy. If the through holes 13 are not provided and the base material of the rotor 10 exists in their areas, potential difference between the conductive base material and charged portions 12 will be small, resulting in small drive torque by electrostatic force. However, providing the through holes 13 maximizes the potential difference and increases the drive torque.

The rotating shaft 11 is a center axis of rotation of the rotor 10, and pierces the center of the rotor 10 as shown in FIGS. 1 and 2(A). Although not shown, the upper and lower ends of the rotating shaft 11 are fixed to a housing of the electrostatic motor 1 with bearings. In FIG. 2(B), the rotating shaft 11 is omitted from illustration.

The charged portions 12 are thin films made of an electret material, and formed radially around the rotating shaft 11 on the upper and lower surfaces of the rotor 10. The charged portions 12 all have the same polarity and are negatively charged, for example. Examples of the electret material of the charged portions 12 include: a resin material, such as CYTOP (registered trademark); a polymeric material, such as polypropylene (PP), polyethylene terephthalate (PET), polyvinyl chloride (PVC), polystyrene (PS), polytetrafluoroethylene (PTFE), polyvinylidene difluoride (PVDF) or polyvinyl fluoride (PVF) (a polymeric material having little hygroscopicity is particularly preferable); and an inorganic material, such as silicon oxide ($SiO_2$) or silicon nitride (SiN).

The stators 20, 30 are made of a well-known substrate material, such as an FPC substrate made of polyimide or liquid crystal polymer (LCP), a glass epoxy substrate, or a transparent substrate made of polyethylene terephthalate (PET) and electrically connected with a transparent conductive film (ITO). As shown in FIG. 2(A), the stators 20, 30 have a disk shape, for example, and are disposed above and below the rotor 10 so as to sandwich it therebetween. The stator 20 is disposed above the rotor 10 to face the upper surface thereof, while the stator 30 is disposed below the rotor 10 to face the lower surface thereof. Unlike the rotor 10, the stators 20, 30 are fixed to the housing of the electrostatic motor 1.

The sets of fixed electrodes 21, 22, 31, 32 are energized for driving the rotor 10, and each set is composed of substantially trapezoidal electrodes as shown in FIG. 1. The fixed electrodes 21, 22 are formed on the lower surface of the stator 20 (surface facing the upper surface of the rotor 10) alternately in the circumferential direction and radially around the rotating shaft 11. So are the fixed electrodes 31, 32 on the upper surface of the stator 30 (surface facing the lower surface of the rotor 10). Fixed electrodes of the same set (i.e., those denoted by the same reference numeral) are evenly spaced in the circumferential direction.

The widths of all of the charged portions 12 and fixed electrodes are the same on the same circumference centered at the rotating shaft 11. The charged portions 12 on each side of the rotor 10 and the fixed electrodes of each set are equal in number. If the circumferential width of a fixed electrode 21 and a fixed electrode 22 adjacent thereto is regarded as a unit, the fixed electrodes 21, 22 are displaced by ¼ units in the direction of arrow C with respect to the fixed electrodes 31, 32. In other words, the fixed electrodes 21, 22 and fixed electrodes 31, 32 are disposed out of phase with each other in the rotating direction of the rotor 10. This phase shift in the circumferential direction causes each fixed electrodes on the stator 20 or 30 to overlap two fixed electrodes on the other of the stators 20, 30.

The driver 3 is a drive circuit of the actuator 2, and applies alternating voltages (drive pulses) having a predetermined drive frequency to the fixed electrodes 21, 22 and fixed electrodes 31, 32 according to a control signal inputted from the controller 4. The polarity of the fixed electrodes 21, 22, 31, 32 changes according to the waveforms of these drive pulses. The driver 3 selectively energizes the fixed electrodes 21, 22, 31, 32 according to the drive pulses, to generate electrostatic force between the charged portions 12 and fixed electrodes 21, 22, 31, 32, thereby rotating the rotor 10.

The controller 4 is constructed from a microcomputer including a CPU and a memory, generates the control signal for driving the actuator 2 and inputs it to the driver 3.

Figure 3:
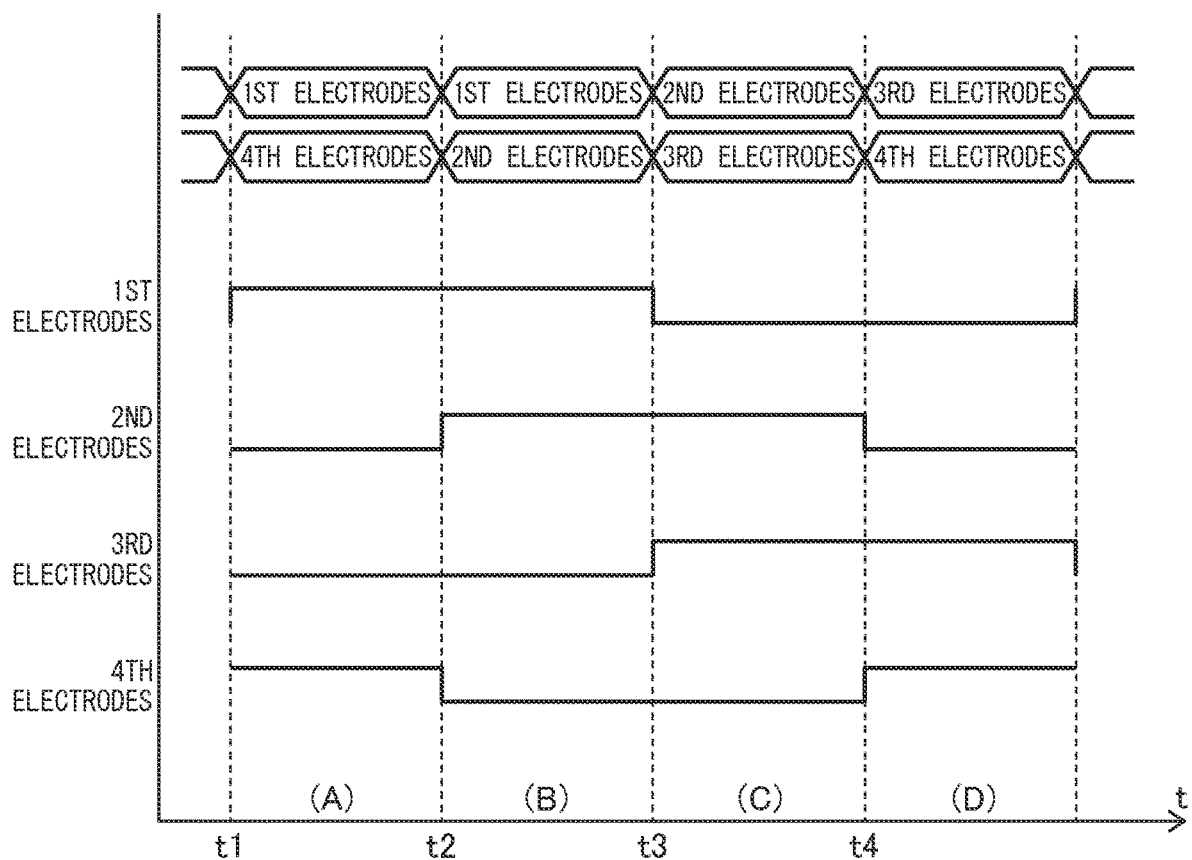
FIG. 3 shows an example of the drive pulses for the actuator 2.

FIG. 3 shows an example of the drive pulses for the actuator 2. The first to fourth electrodes correspond to the fixed electrodes 31, 21, 32, 22 in FIG. 1, respectively. FIG. 3, whose abscissa represents time t, shows the waveforms of voltages applied to the first to fourth electrodes in one cycle of the drive pulses. Each waveform alternately has a half cycle during which the corresponding electrode has a positive potential opposite to the polarity of the charged portions 12 and a half cycle during which that electrode has a negative potential. Since the first to fourth electrodes are displaced in this order in the rotating direction (circumferential direction) of the rotor 10 by ¼ units with the width of adjacent two fixed electrodes regarded as a unit, times t1 to t4 when the respective waveforms rise to a positive potential are also shifted in the same order by ¼ cycles (t1<t2<t3<t4).

In other words, the first to fourth electrodes are energized and become positive in the order of their circumferential arrangement in one cycle of the drive pulses. In the example of FIG. 3, the first and fourth electrodes, first and second electrodes, second and third electrodes, and third and fourth electrodes are positive in periods (A) to (D), respectively, where (A) to (D) denote the ¼-cycle periods starting at times t1 to t4, respectively. Accordingly, in the actuator 2, two sets of electrodes are always driven simultaneously, and the average number of sets of electrodes simultaneously energized in one cycle of the drive pulses is also 2. Thus, in the electrostatic motor 1 including the actuator 2, the average number of sets of electrodes simultaneously energized in one cycle of the drive pulses out of the first to fourth electrodes is equal to the average of the numbers of sets of fixed electrodes on the stators 20, 30 (2 sets each).

FIGS. 4(A) to 4(D) are diagrams for explaining the operation of the actuator 2. These figures schematically show vertical cross sections whose vertical and lateral directions correspond to the thickness and circumferential directions of the actuator 2, respectively. Each figure shows the second and fourth electrodes (fixed electrodes 21, 22) of the stator 20, the charged portions 12 on the upper and lower surfaces of the rotor 10, and the first and third electrodes (fixed electrodes 31, 32) of the stator 30 in this order from top to bottom. The second and fourth electrodes are formed on the same surface, and have the same height in the vertical direction; so are the first and third electrodes. However, these electrodes are displaced in the vertical direction in the figures for ease of viewing. FIGS. 4(A) to 4(D) correspond to periods (A) to (D) shown in FIG. 3, respectively, and highlight electrodes which are positive during the respective periods. Electrostatic force acting between the charged portions 12 and first to fourth electrodes and the rotating direction of the rotor 10 are indicated by arrows.

Figure 4:
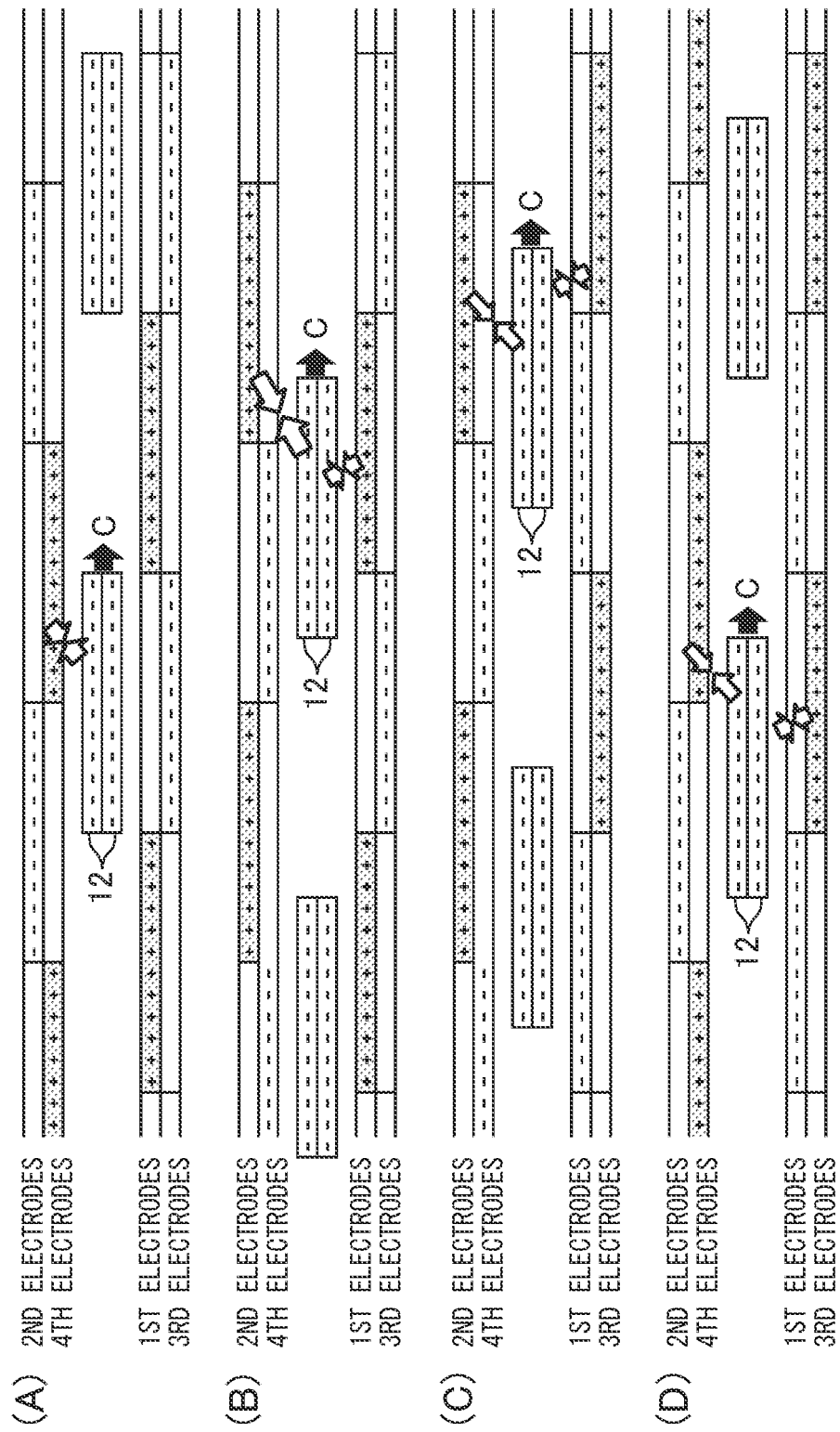
FIGS. 4(A) to 4(D) are diagrams for explaining the operation of the actuator 2.

In the illustrated example, as shown in FIG. 4(A), the rotor 10 is first stopped at a position where the charged portions 12 circumferentially align with the third electrodes, overlap the second and fourth electrodes and do not overlap the first electrodes. Assume that the drive pulses of FIG. 3 are applied in this state. In period (A) starting at time t1, as shown in FIG. 4(A), since the first and fourth electrodes are positive, the rotor 10 receives attraction from the fourth electrodes overlapping the charged portions 12 to rotate in the direction of arrow C (rightward in the figure).

Subsequently, in period (B) starting at time t2, as shown in FIG. 4(B), since the first and second electrodes are positive, the rotor 10 receives attraction from these electrodes overlapping the charged portions 12 to further rotate in the direction of arrow C. Subsequently, in period (C) starting at time t3, as shown in FIG. 4(C), since the second and third electrodes are positive, the rotor 10 receives attraction from these electrodes overlapping the charged portions 12 to further rotate in the direction of arrow C. Subsequently, in period (D) starting at time t4, as shown in FIG. 4(D), since the third and fourth electrodes are positive, the rotor 10 receives attraction from these electrodes overlapping the charged portions 12 to further rotate in the direction of arrow C. The same holds true for the operation after period (D).

In the actuator 2, the circumferential range of each charged portion 12 always overlaps three or four of the first to fourth electrodes in one cycle of the drive pulses; the rotor 10 receives circumferential attraction from two positive electrodes out of these overlapping electrodes. The drive pulses of FIG. 3 cause the first to fourth electrodes to be positive in the order of their circumferential arrangement, which continuously generates driving force (torque) in the direction of arrow C (forward direction). Even if the initial stopping position of the rotor 10 is different from that of the illustrated example, forward torque is continuously generated in a similar manner. Thus, the electrostatic motor 1 including the actuator 2 can start the stationary rotor 10 reliably to rotate forward with the drive pulses of FIG. 3, regardless of the positional relationship between the charged portions of the stationary rotor 10 and the fixed electrodes.

If the fixed electrodes on the lower surface of the stator 20 (surface facing the upper surface of the rotor 10) and those on the upper surface of the stator 30 (surface facing the lower surface of the rotor 10) are disposed in phase, the circumferential range of each charged portion 12 always overlaps two or four of the first to fourth electrodes in one cycle of the drive pulses.

Figure 5:
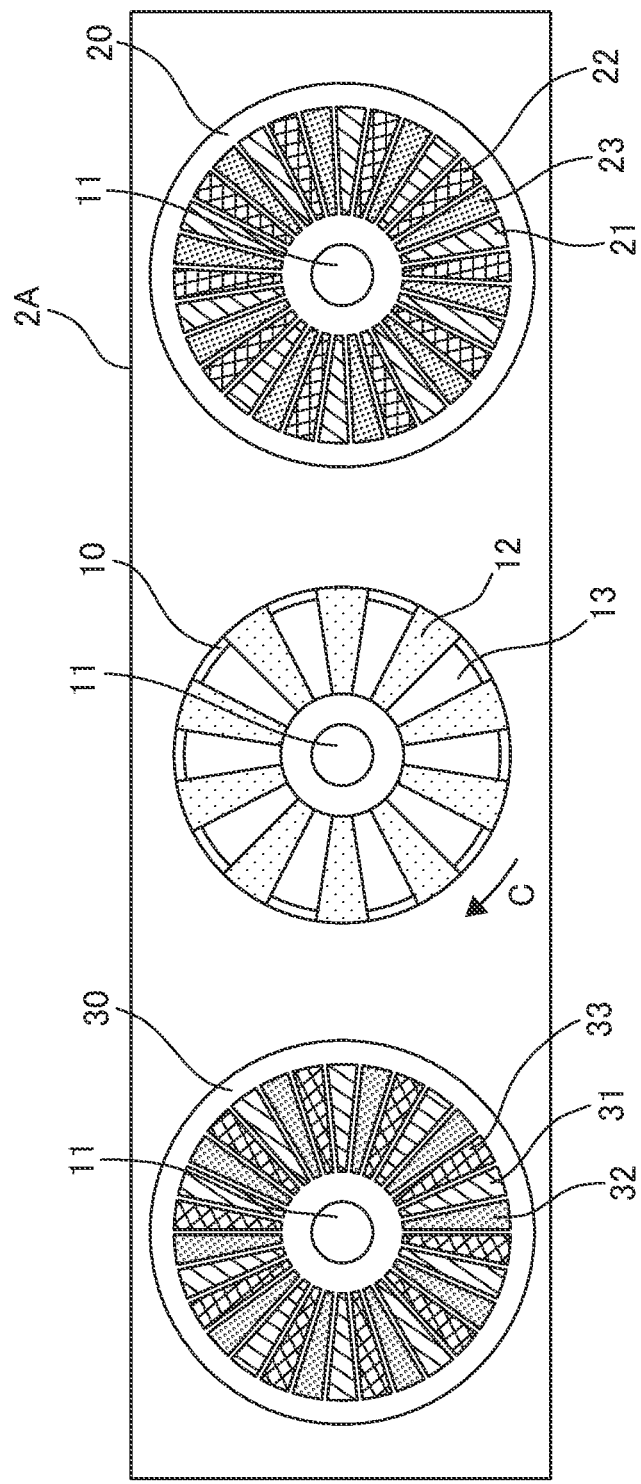
FIG. 5 is a diagram schematically illustrating an actuator 2A.

FIG. 5 is a diagram schematically illustrating an actuator 2A. The actuator 2A is identical in structure to the actuator 2, except for the number of sets of fixed electrodes and their arrangement. The electrostatic motor 1 may include the actuator 2A instead of the actuator 2. The stators 20, 30 of the actuator 2A include three sets of fixed electrodes 21 to 23, and three sets of fixed electrodes 31 to 33, respectively; each set is composed of substantially trapezoidal electrodes. The fixed electrodes 21 to 23 are formed on the lower surface of the stator 20 in this order in the circumferential direction and radially around the rotating shaft 11. So are the fixed electrodes 31 to 33 on the upper surface of the stator 30. Fixed electrodes of the same set are evenly spaced in the circumferential direction.

The widths of all of the fixed electrodes are the same on the same circumference centered at the rotating shaft 11, but are $\frac{2}{3}$ of those of the charged portions 12. The charged portions 12 on each side of the rotor 10 and the fixed electrodes of each set are equal in number. If the circumferential width of a fixed electrode 21 and fixed electrodes 22, 23 adjacent thereto is regarded as a unit, the fixed electrodes 21 to 23 are displaced by $\frac{1}{12}$ units in the direction of arrow C with respect to the fixed electrodes 31 to 33.

Figure 6:
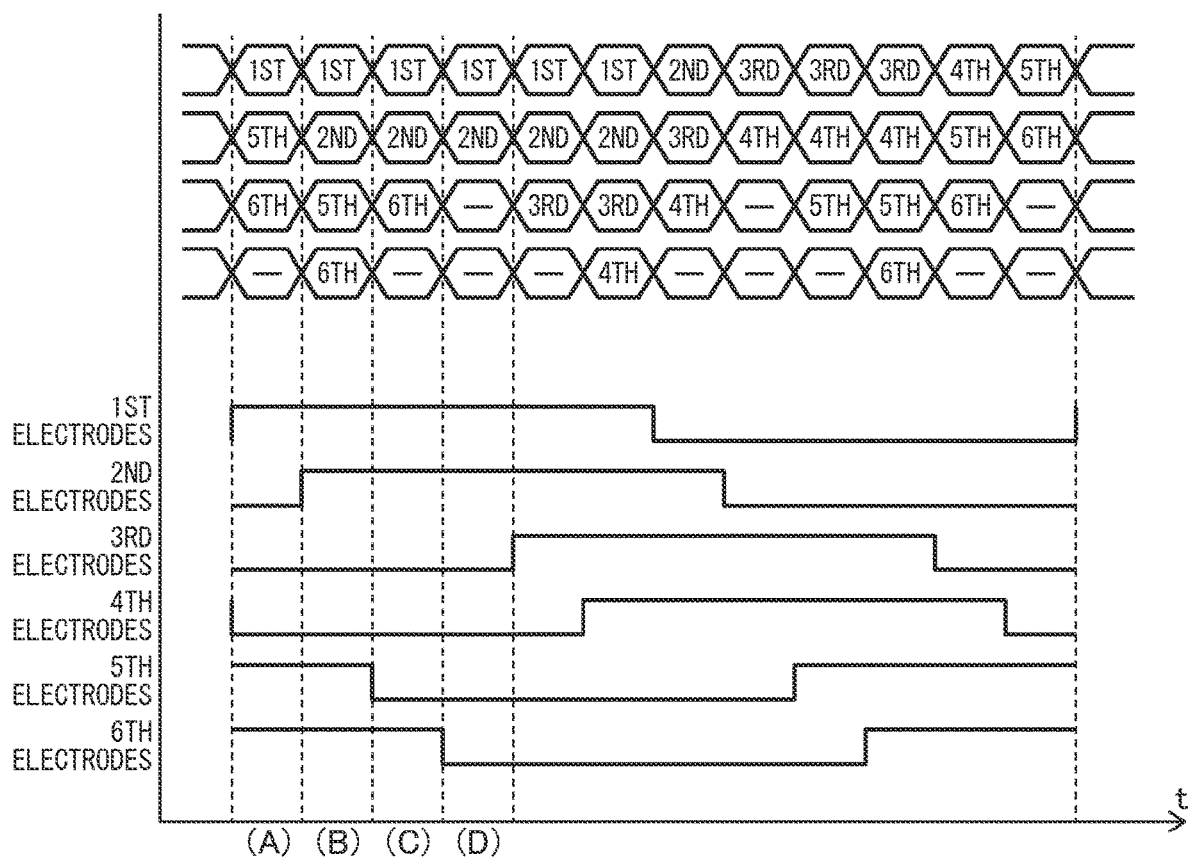
FIG. 6 shows an example of the drive pulses for the actuator 2A.

FIG. 6 shows an example of the drive pulses for the actuator 2A. The first to sixth electrodes correspond to the fixed electrodes 31, 21, 32, 22, 33, 23 in FIG. 5, respectively. Since the first to sixth electrodes are displaced in this order in the circumferential direction, half-cycle periods of the drive pulses during which the first to sixth electrodes respectively become positive also appear in the same order. In particular, the phases of waveforms of the second, fourth and sixth electrodes are delayed by $\frac{1}{12}$ cycles with respect to those of the first, third and fifth electrodes, reflecting the displacements of the fixed electrodes 21 to 23 from the fixed electrodes 31 to 33.

In the example of FIG. 6, the first, fifth and sixth electrodes, the first, second, fifth and sixth electrodes, the first, second and sixth electrodes, and the first and second electrodes are positive in periods (A) to (D), respectively, where (A) to (D) denote the $\frac{1}{12}$-cycle successive periods starting from the leftmost time when the first electrodes become positive. In one cycle of the drive pulses for the actuator 2A, two to four sets of electrodes are driven simultaneously, and the average number of sets of electrodes simultaneously energized is 3. Thus, in the electrostatic motor including the actuator 2A, the average number of sets of electrodes simultaneously energized in one cycle of the drive pulses out of the first to sixth electrodes is equal to the average of the numbers of sets of fixed electrodes on the stators 20, 30 (3 sets each).

FIGS. 7(A) to 7(D) are diagrams for explaining the operation of the actuator 2A. Each figure shows the second, fourth and sixth electrodes (fixed electrodes 21 to 23) of the stator 20, the charged portions 12 on the upper and lower surfaces of the rotor 10, and the first, third and fifth electrodes (fixed electrodes 31 to 33) of the stator 30 in the order from top to bottom, similarly to FIGS. 4(A) to 4(D). FIGS. 7(A) to 7(D) correspond to periods (A) to (D) shown in FIG. 6, respectively, and highlight electrodes which are positive during the respective periods. Electrostatic force acting between the charged portions 12 and first to sixth electrodes and the rotating direction of the rotor 10 are indicated by arrows.

Figure 7:
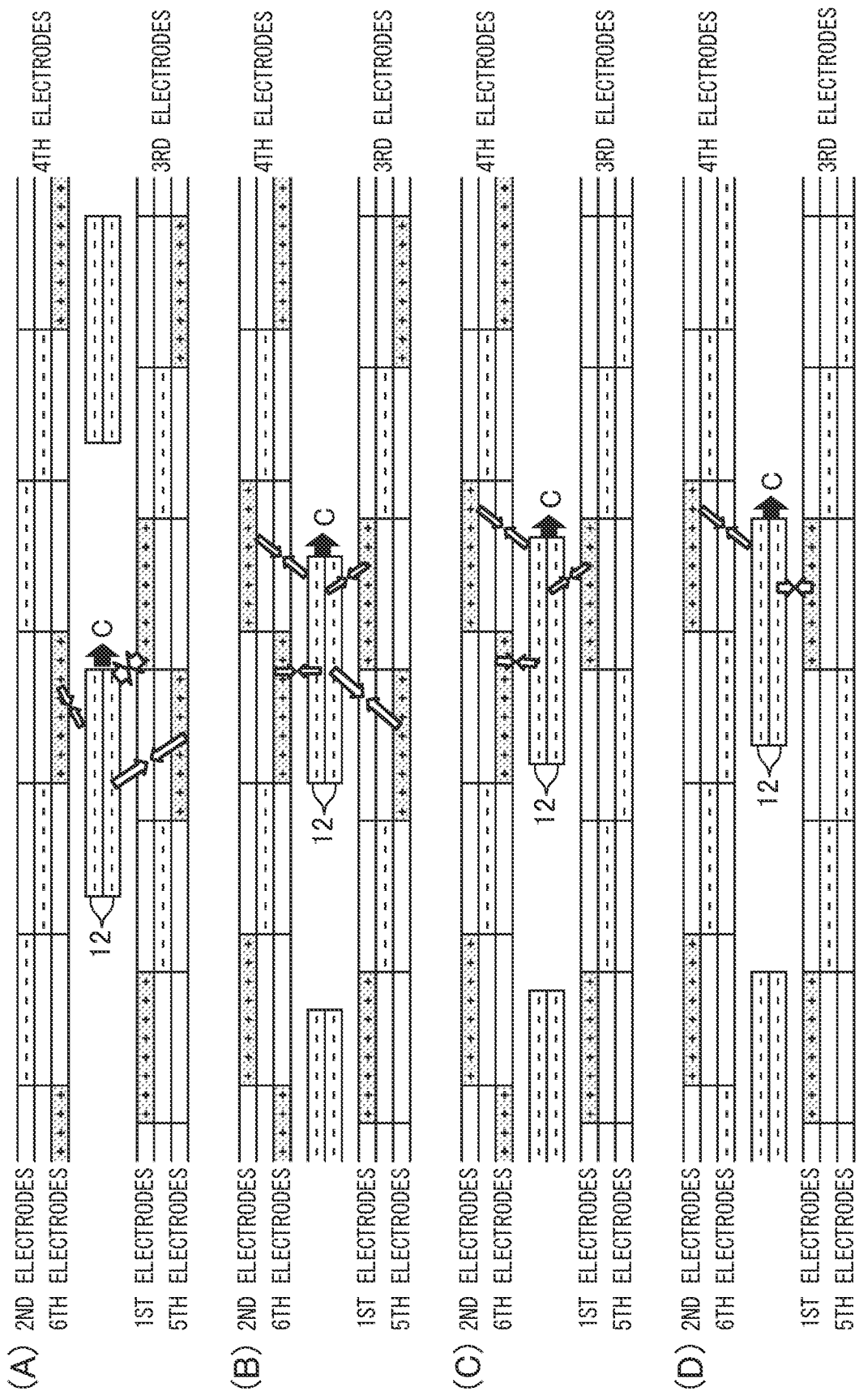
FIGS. 7(A) to 7(D) are diagrams for explaining the operation of the actuator 2A.

In the illustrated example, as shown in FIG. 7(A), the rotor 10 is first stopped at a position where the charged portions 12 overlap the third to sixth electrodes and do not overlap the first and second electrodes. Assume that the drive pulses of FIG. 6 are applied in this state. In period (A), as shown in FIG. 7(A), since the first, fifth and sixth electrodes are positive, the rotor 10 receives attraction from the first electrodes obliquely adjacent to the charged portions 12 and from the fifth and sixth electrodes overlapping the charged portions 12 to rotate in the direction of arrow C (rightward in the figure). In subsequent periods (B) to (D) also, as shown in FIGS. 7(B) to 7(D), the rotor 10 similarly receives attraction from positive electrodes overlapping the charged portions 12 out of the first to sixth electrodes. In each period, since resultant force of the attraction from these electrodes is in the direction of arrow C, the rotor 10 further rotates in that direction. The same holds true for the operation after period (D).

In the actuator 2A, the circumferential range of each charged portion 12 always overlaps four or five of the first to sixth electrodes in one cycle of the drive pulses; the rotor 10 receives circumferential attraction from two to four positive electrodes out of these overlapping electrodes. The drive pulses of FIG. 6 cause the first to sixth electrodes to be positive in the order of their circumferential arrangement, which continuously generates forward torque. Thus, the electrostatic motor including the actuator 2A can also start the rotor 10 reliably to rotate forward, regardless of the positional relationship between the charged portions of the stationary rotor 10 and the fixed electrodes.

If the fixed electrodes on the lower surface of the stator 20 (surface facing the upper surface of the rotor 10) and those on the upper surface of the stator 30 (surface facing the lower surface of the rotor 10) are disposed in phase, the circumferential range of each charged portion 12 always overlaps four or six of the first to sixth electrodes in one cycle of the drive pulses.

Figure 8:
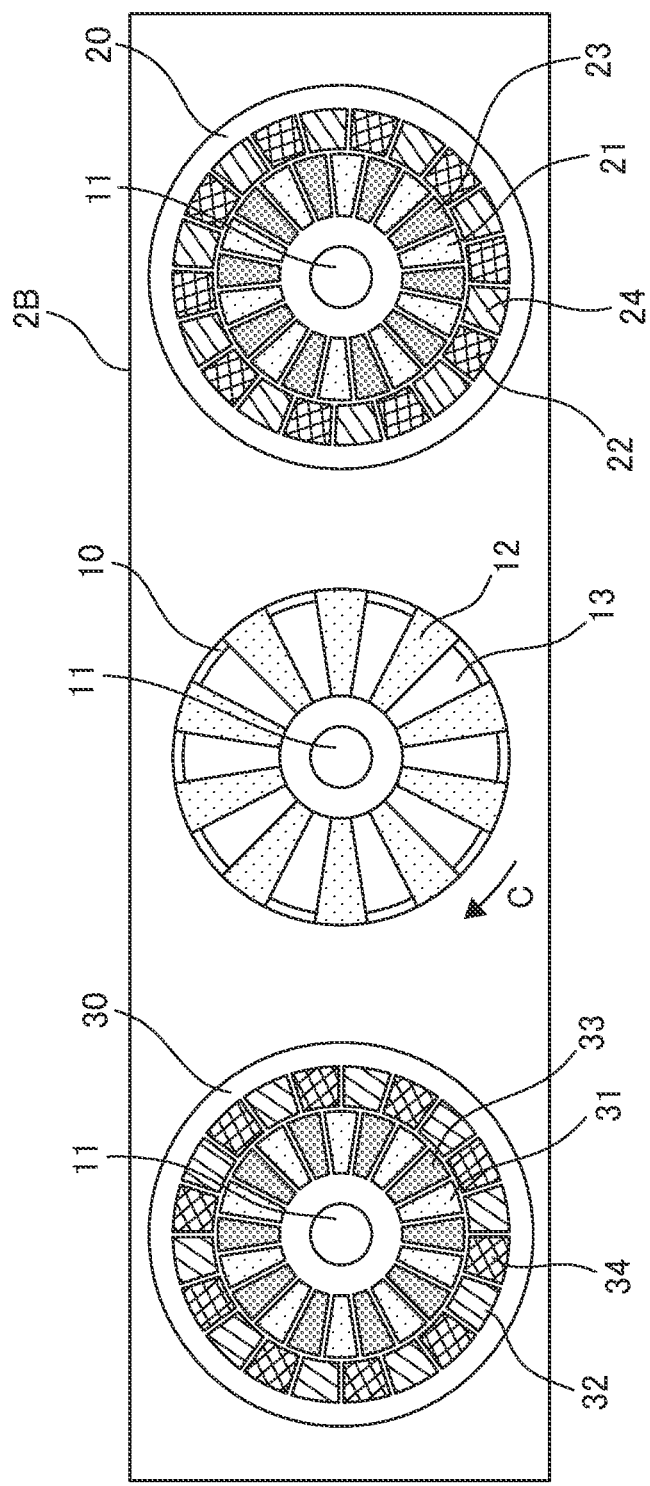
FIG. 8 is a diagram schematically illustrating an actuator 2B.

FIG. 8 is a diagram schematically illustrating an actuator 2B. The actuator 2B is identical in structure to the actuator 2, except for the number of sets of fixed electrodes and their arrangement. The electrostatic motor 1 may include the actuator 2B instead of the actuator 2. In the actuator 2B, the stator 20 includes four sets of fixed electrodes 21 to 24 on the lower surface thereof, while the stator 30 includes four sets of fixed electrodes 31 to 34 on the upper surface thereof; each set is composed of substantially trapezoidal electrodes. Fixed electrodes of the same set are evenly spaced in the circumferential direction.

The fixed electrodes 21, 23 are formed on the inner side of the stator 20 (closer to the rotating shaft 11) alternately and radially around the rotating shaft 11; so are the fixed electrodes 22, 24 closer to the outer edge of the stator 20 (further from the rotating shaft 11) than the fixed electrodes 21, 23. Similarly, the fixed electrodes 31, 33 are formed on the inner side of the stator 30 alternately and radially around the rotating shaft 11; so are the fixed electrodes 32, 34 closer to the outer edge of the stator 30 than the fixed electrodes 31, 33. In other words, the fixed electrodes 21, 23 and fixed electrodes 22, 24 and the fixed electrodes 31, 33 and fixed electrodes 32, 34 are concentrically disposed around the rotating shaft 11 on the stators 20, 30, respectively.

The widths of all of the charged portions 12 and fixed electrodes are the same on the same circumference centered at the rotating shaft 11. The charged portions 12 on each side of the rotor 10 and the fixed electrodes of each set are equal in number. If the circumferential width of a fixed electrode 21 and a fixed electrode 23 adjacent thereto is regarded as a unit, the fixed electrodes 22, 24 are displaced by $\frac{1}{4}$ units in the direction of arrow C with respect to the fixed electrodes 21, 23. Similarly, the fixed electrodes 32, 34 are displaced by $\frac{1}{4}$ units in the direction of arrow C with respect to the fixed electrodes 31, 33. The fixed electrodes 21 to 24 are displaced by ⅛ units in the direction of arrow C with respect to the fixed electrodes 31 to 34.

Figure 9:
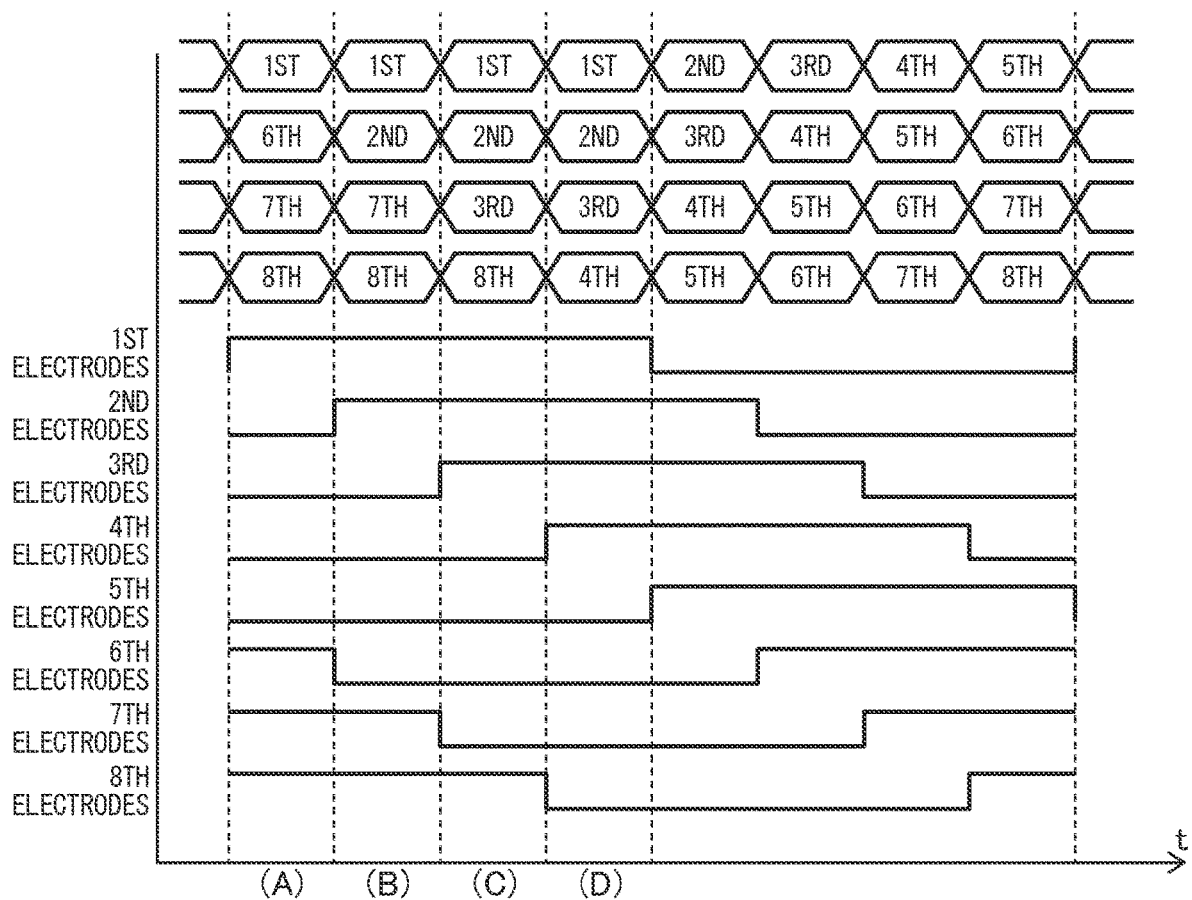
FIG. 9 shows an example of the drive pulses for the actuator 2B.

FIG. 9 shows an example of the drive pulses for the actuator 2B. The first to eighth electrodes correspond to the fixed electrodes 31, 21, 32, 22, 33, 23, 34, 24 in FIG. 8, respectively. Since the first to eighth electrodes are displaced in this order in the circumferential direction by ⅛ units with the width of adjacent two fixed electrodes regarded as a unit, half-cycle periods of the drive pulses during which the first to eighth electrodes respectively become positive also appear in the same order with each period shifted by ⅛ cycles.

In the example of FIG. 9, the first and sixth to eighth electrodes, the first, second, seventh and eighth electrodes, the first to third and eighth electrodes, and the first to fourth electrodes are positive in periods (A) to (D), respectively, where (A) to (D) denote the ⅛-cycle successive periods starting from the leftmost time when the first electrodes become positive. In the actuator 2B, four sets of electrodes are always driven simultaneously, and the average number of sets of electrodes simultaneously energized in one cycle of the drive pulses is also 4. Thus, in the electrostatic motor including the actuator 2B, the average number of sets of electrodes simultaneously energized in one cycle of the drive pulses out of the first to eighth electrodes is equal to the average of the numbers of sets of fixed electrodes on the stators 20, 30 (4 sets each).

FIGS. 10(A) to 10(D) are diagrams for explaining the operation of the actuator 2B. Each figure shows the second, fourth, sixth and eighth electrodes (fixed electrodes 21 to 24) of the stator 20, the charged portions 12 on the upper and lower surfaces of the rotor 10, and the first, third, fifth and seventh electrodes (fixed electrodes 31 to 34) of the stator 30 in the order from top to bottom, similarly to FIGS. 4(A) to 4(D). FIGS. 10(A) to 10(D) correspond to periods (A) to (D) shown in FIG. 9, respectively, and highlight electrodes which are positive during the respective periods. Electrostatic force acting between the charged portions 12 and first to eighth electrodes and the rotating direction of the rotor 10 are indicated by arrows.

Figure 10:
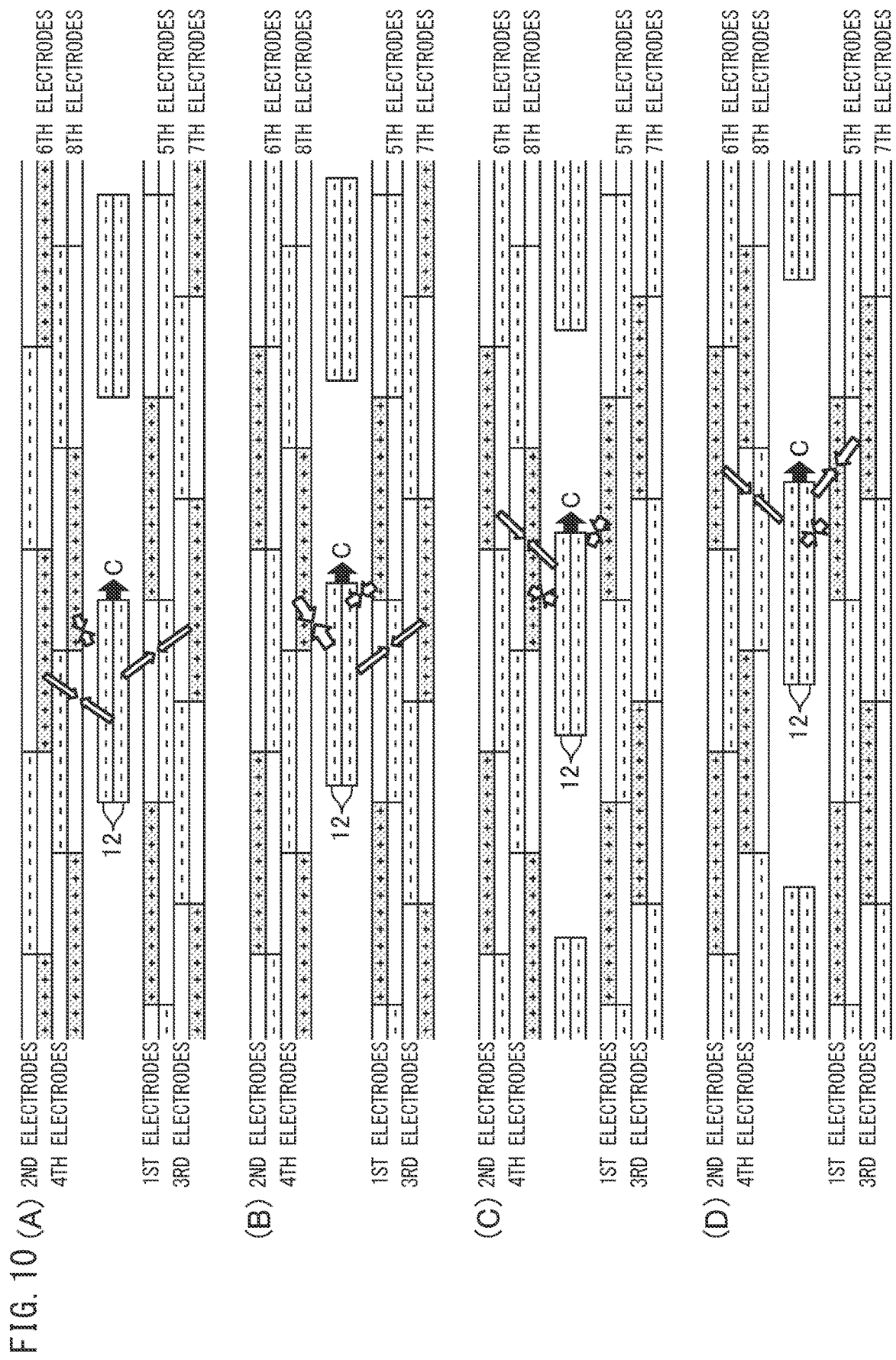
FIGS. 10(A) to 10(D) are diagrams for explaining the operation of the actuator 2B.

In the illustrated example, as shown in FIG. 10(A), the rotor 10 is first stopped at a position where the charged portions 12 circumferentially align with the fifth electrodes, overlap the second to fourth and sixth to eighth electrodes and do not overlap the first electrodes. Assume that the drive pulses of FIG. 9 are applied in this state. In period (A), as shown in FIG. 10(A), since the first and sixth to eighth electrodes are positive, the rotor 10 receives attraction from the sixth to eighth electrodes overlapping the charged portions 12 to rotate in the direction of arrow C (rightward in the figure). In subsequent periods (B) to (D) also, as shown in FIGS. 10(B) to 10(D), the rotor 10 similarly receives attraction from positive electrodes overlapping the charged portions 12 out of the first to eighth electrodes. In each period, since resultant force of the attraction from these electrodes is in the direction of arrow C, the rotor 10 further rotates in that direction. The same holds true for the operation after period (D).

In the actuator 2B, the circumferential range of each charged portion 12 always overlaps seven or eight of the first to eighth electrodes in one cycle of the drive pulses; the rotor 10 receives circumferential attraction from three or four positive electrodes out of these overlapping electrodes. The drive pulses of FIG. 9 cause the first to eighth electrodes to be positive in the order of their circumferential arrangement, which continuously generates forward torque. Thus, the electrostatic motor including the actuator 2B can also start the rotor 10 reliably to rotate forward, regardless of the positional relationship between the charged portions of the stationary rotor 10 and the fixed electrodes.

If the fixed electrodes on the lower surface of the stator 20 (surface facing the upper surface of the rotor 10) and those on the upper surface of the stator 30 (surface facing the lower surface of the rotor 10) are disposed in phase, the circumferential range of each charged portion 12 always overlaps six or eight of the first to eighth electrodes in one cycle of the drive pulses.

Figure 11:
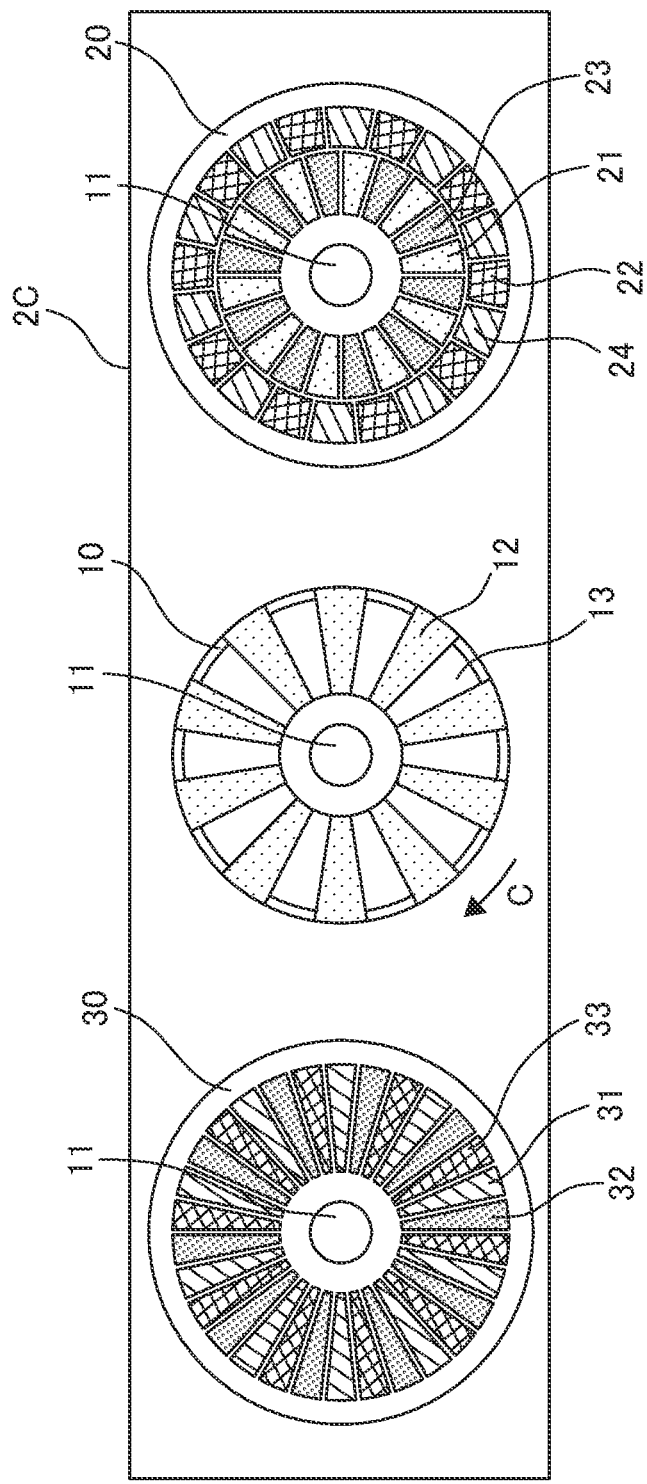
FIG. 11 is a diagram schematically illustrating an actuator 2C.

FIG. 11 is a diagram schematically illustrating an actuator 2C. The actuator 2C is identical in structure to the actuator 2, except for the number of sets of fixed electrodes and their arrangement. The electrostatic motor 1 may include the actuator 2C instead of the actuator 2. In the actuator 2C, the stator 20 includes four sets of fixed electrodes 21 to 24 on the lower surface thereof, while the stator 30 includes three sets of fixed electrodes 31 to 33 on the upper surface thereof. Accordingly, in the actuator 2C, the numbers of sets of fixed electrodes on the stators 20, 30 are different from each other, unlike the actuators 2, 2A, 2B. The shape and arrangement of the fixed electrodes 21 to 24 are the same as in the actuator 2B, while those of the fixed electrodes 31 to 33 are the same as in the actuator 2A.

Figure 12:
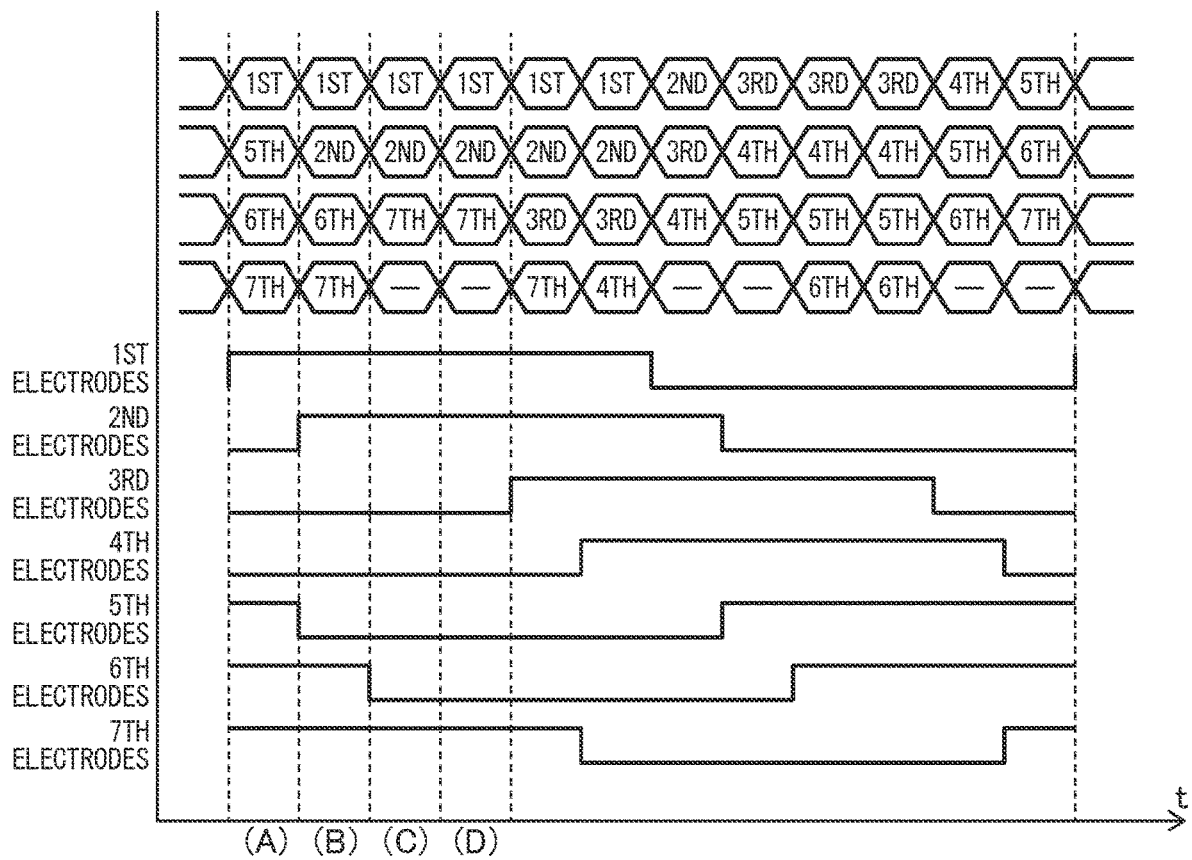
FIG. 12 shows an example of the drive pulses for the actuator 2C.

FIG. 12 shows an example of the drive pulses for the actuator 2C. The first to seventh electrodes correspond to the fixed electrodes 31, 21, 32, 22, 23, 33, 24 in FIG. 11, respectively. Since the first to seventh electrodes are displaced in this order in the circumferential direction, half-cycle periods of the drive pulses during which the first to seventh electrodes respectively become positive also appear in the same order.

In the example of FIG. 12, the first and fifth to seventh electrodes are positive in period (A); the first, second, sixth and seventh electrodes are positive in period (B); the first, second and seventh electrodes are positive in periods (C) and (D), where (A) to (D) denote the 1/12-cycle successive periods starting from the leftmost time when the first electrodes become positive. In one cycle of the drive pulses for the actuator 2C, three or four sets of electrodes are driven simultaneously, and the average number of sets of electrodes simultaneously energized is 3.5. Thus, in the electrostatic motor including the actuator 2C, the average number of sets of electrodes simultaneously energized in one cycle of the drive pulses out of the first to seventh electrodes is equal to the average of the numbers of sets of fixed electrodes on the stators 20, 30 (4 and 3 sets, respectively).

FIGS. 13(A) to 13(D) are diagrams for explaining the operation of the actuator 2C. Each figure shows the second, fourth, fifth and seventh electrodes (fixed electrodes 21 to 24) of the stator 20, the charged portions 12 on the upper and lower surfaces of the rotor 10, and the first, third and sixth electrodes (fixed electrodes 31 to 33) of the stator 30 in the order from top to bottom, similarly to FIGS. 4(A) to 4(D). FIGS. 13(A) to 13(D) correspond to periods (A) to (D) shown in FIG. 12, respectively, and highlight electrodes which are positive during the respective periods. Electrostatic force acting between the charged portions 12 and first to seventh electrodes and the rotating direction of the rotor 10 are indicated by arrows.

Figure 13:
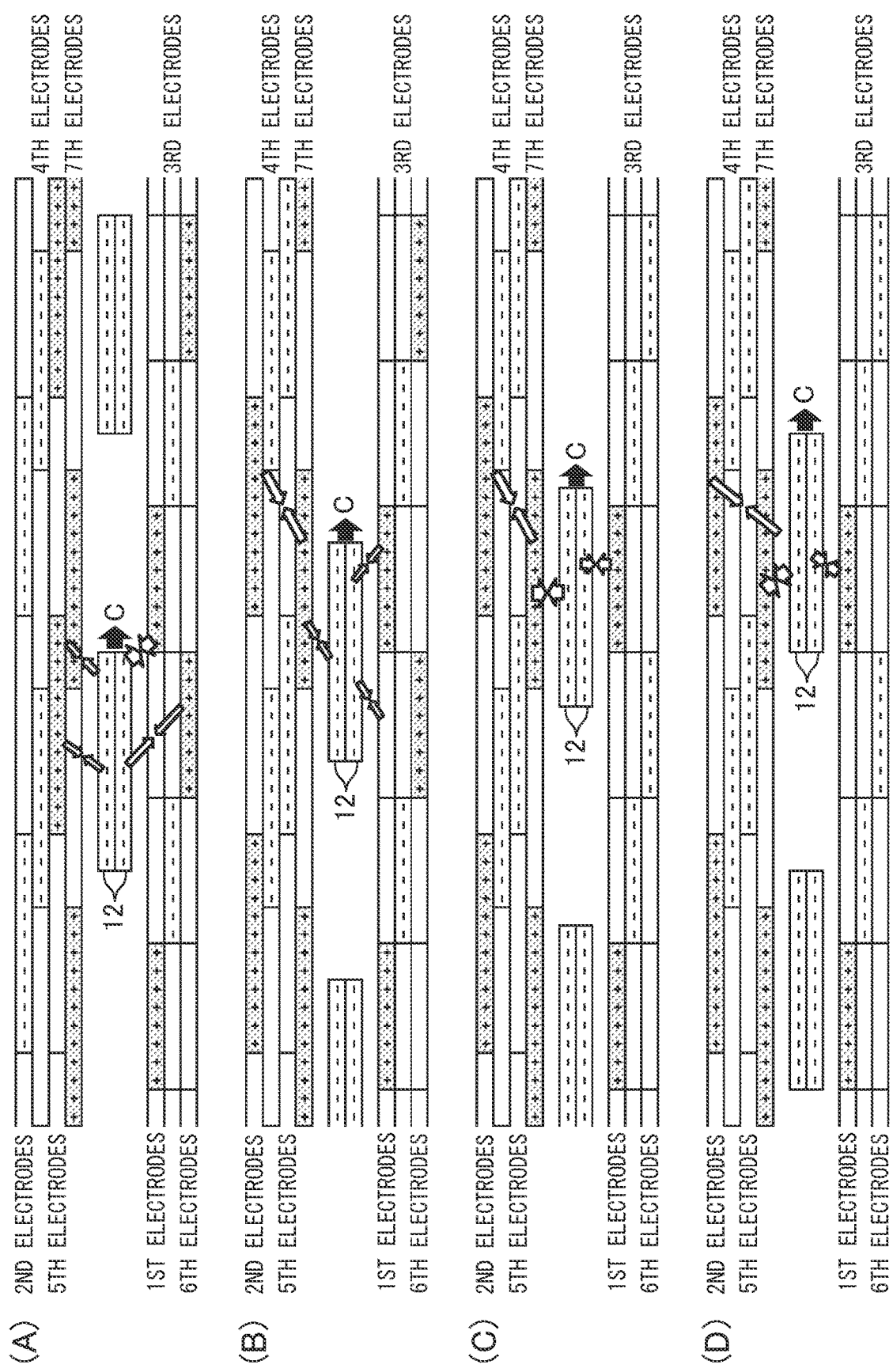
FIGS. 13(A) to 13(D) are diagrams for explaining the operation of the actuator 2C.

In the illustrated example, as shown in FIG. 13(A), the rotor 10 is first stopped at a position where the charged portions 12 overlap the second to seventh electrodes and do not overlap the first electrodes. Assume that the drive pulses of FIG. 12 are applied in this state. In period (A), as shown in FIG. 13(A), since the first and fifth to seventh electrodes are positive, the rotor 10 receives attraction from the first electrodes obliquely adjacent to the charged portions 12 and from the fifth to seventh electrodes overlapping the charged portions 12 to rotate in the direction of arrow C (rightward in the figure). In subsequent periods (B) to (D) also, as shown in FIGS. 13(B) to 13(D), the rotor 10 similarly receives attraction from positive electrodes overlapping the charged portions 12 out of the first to seventh electrodes. In each period, since resultant force of the attraction from these electrodes is in the direction of arrow C, the rotor 10 further rotates in that direction. The same holds true for the operation after period (D).

In the actuator 2C, the circumferential range of each charged portion 12 always overlaps five to seven of the first to sixth electrodes in one cycle of the drive pulses; the rotor 10 receives circumferential attraction from three or four positive electrodes out of these overlapping electrodes. The drive pulses of FIG. 12 cause the first to seventh electrodes to be positive in the order of their circumferential arrangement, which continuously generates forward torque. Thus, the electrostatic motor including the actuator 2C can also start the rotor 10 reliably to rotate forward, regardless of the positional relationship between the charged portions of the stationary rotor 10 and the fixed electrodes.

Figure 14:
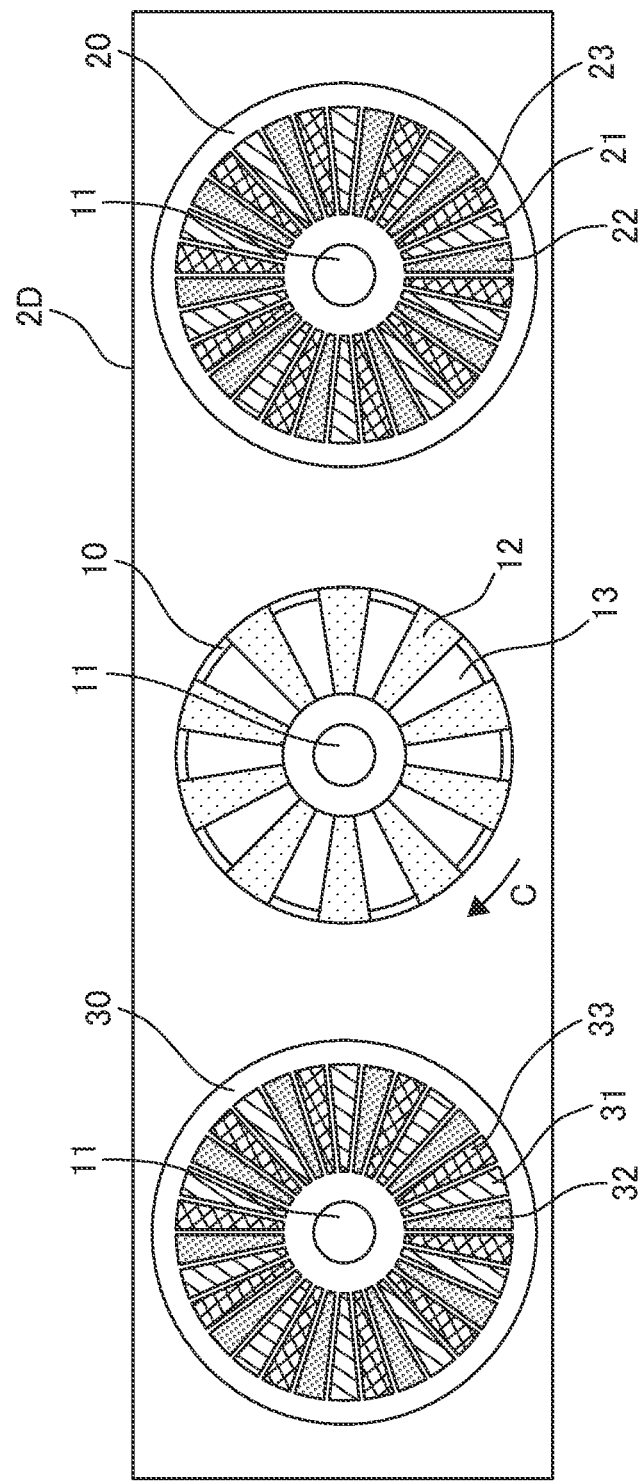
FIG. 14 is a diagram schematically illustrating an actuator 2D.

FIG. 14 is a diagram schematically illustrating an actuator 2D. The actuator 2D is identical in structure to the actuator 2A in FIG. 5, except for the arrangement of fixed electrodes. The electrostatic motor 1 may include the actuator 2D instead of the actuator 2. Similarly to the actuator 2A, the actuator 2D also includes three sets of fixed electrodes 21 to 23 on the lower surface of the stator 20, and three sets of fixed electrodes 31 to 33 on the upper surface of the stator 30; both are formed in this order in the circumferential direction and radially around the rotating shaft 11. However, in the actuator 2D, the fixed electrodes 21 to 23 and fixed electrodes 31 to 33 are disposed without any phase differences, unlike the actuator 2A. More specifically, the fixed electrodes 21, 22, 23 circumferentially align with the fixed electrodes 31, 32, 33, respectively; they are exactly superposed in the vertical direction.

FIG. 15 (A) shows an example of the drive pulses for the actuator 2D, while FIG. 15(B) shows the positional relationship between the charged portions 12 of the rotor 10 and the fixed electrodes. The first to sixth electrodes correspond to the fixed electrodes 31, 21, 32, 22, 33, 23 in FIG. 14, respectively. Since the first, third and fifth electrodes circumferentially align with the second, fourth and sixth electrodes, respectively, the drive pulses for the actuator 2D is of three phases. More specifically, the drive pulses U1, V1, W1 applied to the first, third and fifth electrodes are in phase with (have the same patterns as) the drive pulses U2, V2, W2 applied to the second, fourth and sixth electrodes, respectively. The drive pulses for the actuator 2D have three rising edges to a positive potential in one cycle T.

Reflecting the displacements of the first to sixth electrodes, the drive pulses U1, U2, drive pulses V1, V2, and drive pulses W1, W2 become positive in this order during the respective half-cycle periods with the phase differences of ⅔ cycles. In one cycle of the drive pulses for the actuator 2D, two to four sets of electrodes are driven simultaneously, and the average number of sets of electrodes simultaneously energized is 3. Thus, in the electrostatic motor including the actuator 2D, the average number of sets of electrodes simultaneously energized in one cycle of the drive pulses out of the first to sixth electrodes is equal to the average of the numbers of sets of fixed electrodes on the stators 20, 30 (3 sets each).

In the actuator 2D, the circumferential range of each charged portion 12 always overlaps four or six of the first to sixth electrodes in one cycle of the drive pulses; the rotor 10 receives circumferential attraction from two to four positive electrodes out of these overlapping electrodes. The drive pulses of FIG. 15(A) cause the first to sixth electrodes to be positive in the order of their circumferential arrangement, which continuously generates forward torque. Thus, the electrostatic motor including the actuator 2D can also start the rotor 10 reliably to rotate forward, regardless of the positional relationship between the charged portions of the stationary rotor 10 and the fixed electrodes.

The minimum torque required for rotating the rotor of an electrostatic motor depends on factors, such as the outer diameter of the rotor, the number of charged portions and fixed electrodes (the number of their substantially trapezoidal regions), their areas and the voltages applied to the fixed electrodes, and is experimentally determined. In particular, if the electrostatic motor is used as a hand-moving motor of a timepiece, it is necessary to rotate the second hand twice as fast as usual in order to make up for a 30-second delay in the next round, for example. Taking these restraints into consideration, at least ⅓₀ µNm of torque is required in the rotating direction for application to timepieces. Even with any of the actuators 2, 2A to 2D, the electrostatic motor 1 can generate torque larger than this minimum in the rotating direction by the above-mentioned drive pulses, and is thus suitable for use as a hand-moving motor of a timepiece.

Since the rotor 10 surely rotates forward regardless of the positional relationship between the charged portions of the stationary rotor 10 and the fixed electrodes, the electrostatic motor including any one of the actuators 2, 2A to 2D need not detect the position of the charged portions on starting the rotor 10. Thus, a means for position detection is not required, which simplifies the structure of the electrostatic motor accordingly.

In the actuators 2, 2A, 2B wherein the numbers of sets of fixed electrodes on the stators 20, 30 are the same and disposed out of phase with each other in the rotating direction of the rotor 10, fluctuations of the driving force in the rotating direction are flattened, resulting in a smooth waveform of the torque. In this case, since cogging torque is reduced and the speed of the rotor 10 hardly fluctuates after startup, use of the electrostatic motor 1 as a hand-moving motor of a timepiece allows for smoothly moving the second hand. However, in the actuator 2C wherein the numbers of sets of fixed electrodes on the stators 20, 30 are different from each other, the torque fluctuates on a relatively large scale in one cycle of the drive pulses. In this case, since the speed of the rotor 10 fluctuates, use of the electrostatic motor 1 as a hand-moving motor of a timepiece allows for quivering the second hand. Accordingly, appropriately selecting the number of sets of fixed electrodes and their arrangement provides an electrostatic motor for driving the hand in a desired pattern.

If the charged portions are provided on only one surface of the rotor and the fixed electrodes are provided so as to face only that surface, attraction by electrostatic force between the charged portions and fixed electrodes generates friction in the direction of the rotating shaft. However, in the actuators 2, 2A to 2D wherein the fixed electrodes are provided so as to face the upper and lower surfaces of the rotor 10 and the charged portions 12 on those surfaces have the same amounts of electrostatic charge and are equally spaced from the fixed electrodes on the stators 20, 30, electrostatic force in the direction of the rotating shaft is canceled out, resulting in small frictional load on the rotor 10. Thus, drive torque in the rotating direction can be efficiently taken out from the applied electric power.

If the amounts of electrostatic charge in the charged portions 12 are different between the upper and lower surfaces of the rotor 10 due to variations in those amounts or the difference in charged area between those surfaces, for example, the distances between the rotor 10 and stators 20, 30 may be changed so that electrostatic force is the same on both surfaces of the rotor 10. More specifically, the distance from the rotor 10 to the fixed electrodes on one of the upper and lower sides of the rotor 10 where the amount of electrostatic charge is larger may be made longer than that distance on the other side where the amount of electrostatic charge is smaller. This can equalize electrostatic attraction on the upper and lower sides of the rotor 10, and thus reduce rotational load.

Disposing the charged portions and fixed electrodes on both sides of the rotor 10 also has the advantage of easily reducing its diameter, since a large number of electrodes can be disposed even in small space. Although enlarging the diameter of the rotor 10 can increase the areas of the charged portions 12 and the amount of electrostatic charge, this makes the rotor 10 heavier and thus increases the possibility that the rotor 10 cannot rotate according to the drive pulses and loses synchronization. However, since the driving force can be significantly increased by disposing the charged portions 12 and fixed electrodes on the upper and lower surfaces of the rotor 10 and on the stators 20, 30 facing the rotor 10, respectively, the actuators 2, 2A to 2D can stably drive the rotor 10 without enlarging its diameter.

The fixed electrodes on the stator 20 may be displaced in the direction opposite to arrow C with respect to those on the stator 30, unlike the actuators 2, 2A to 2C shown in FIGS. 1, 5, 8 and 11. Even in this case, the drive pulses may be changed from those shown in FIGS. 3, 6, 9 and 12 according to the arrangement of the fixed electrodes, to rotate the rotor 10 as in the actuators 2, 2A to 2C.

In assembling the actuators, it is necessary to accurately assemble the stators 20, 30 so that the phases of the sets of fixed electrodes on the stators 20, 30 satisfy a predetermined relationship. In manufacturing the stators 20, 30, since the process includes a few steps wherein a base material is cut out and then provided with a pattern of fixed electrodes by etching, increasing positional accuracy of the fixed electrodes is a problem to be solved. One possible way to address this problem is, for example, providing the cut-out stators with positioning holes, inserting pins of a positioning jig into the positioning holes to position the stators, and then performing etching. However, since the positioning holes are not accurately processed and gaps are required between the pins of the jig and the positioning holes, this way may lead to misaligned etching and may not ensure the accuracy of the phases of the fixed electrodes on the stators 20, 30.

It is thus preferred to etch, together with patterns of fixed electrodes, positioning marks on the stators 20, 30 closer to their outer edges than the fixed electrodes. Providing positioning marks also on a member for fixing the stators 20, 30 and aligning those marks on the stators 20, 30 and fixing member with each other allows for assembling the stators 20, 30 while ensuring the accuracy of the phases of the fixed electrodes on the stators 20, 30.

On startup, the rotor 10 may be rotated in the direction opposite to the forward direction (reverse rotation) by the first applied drive pulses (hereinafter, referred to as "starting pulses"), depending on the positional relationship between the charged portions and fixed electrodes. Further, if the rotor 10 is not provided with sufficient drive torque exceeding inertial torque and the frequency of drive pulses is increased, the reverse rotation may continue.

Figure 16:
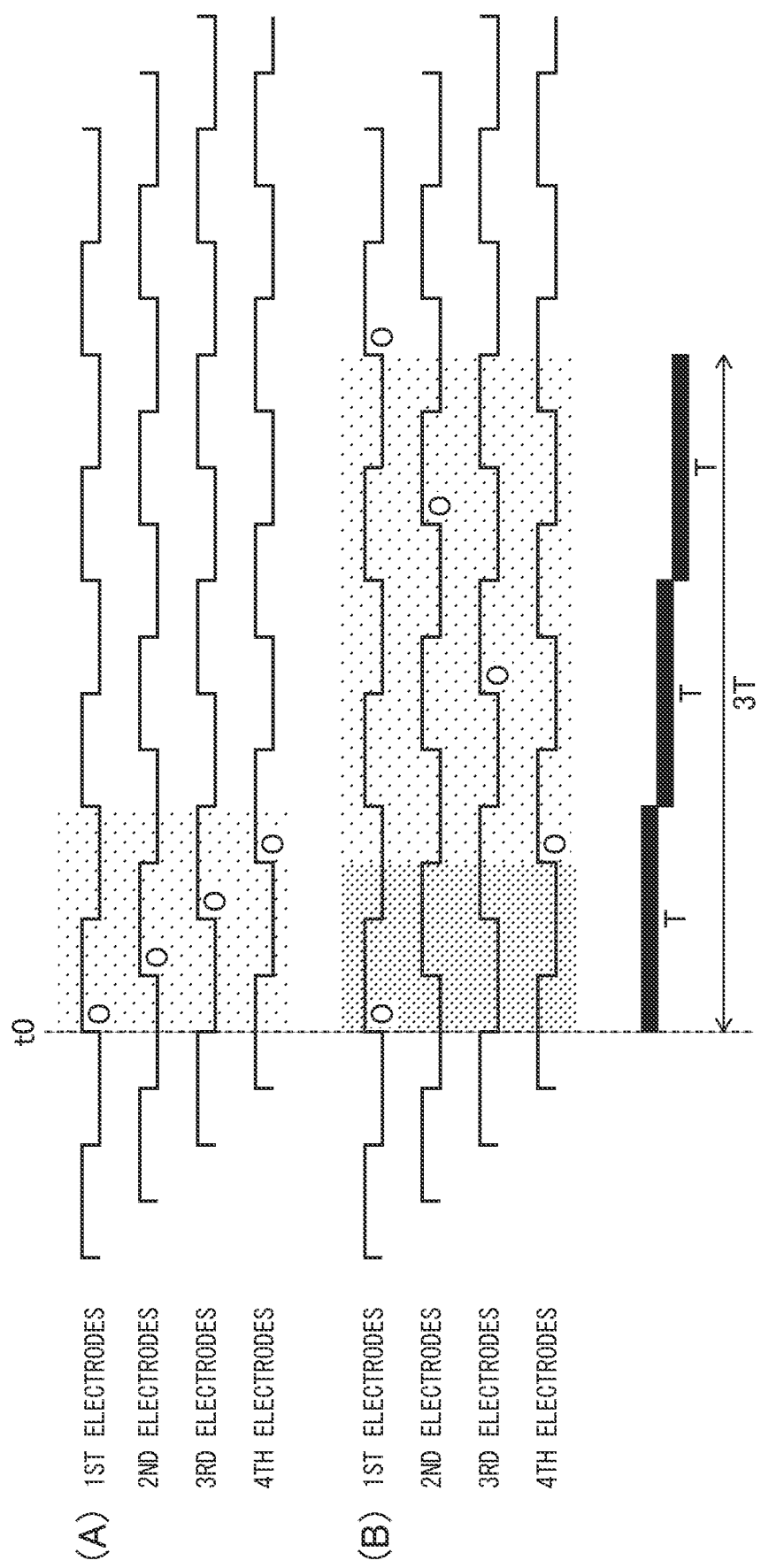
FIGS. 16(A) and 16(B) are diagrams for explaining reverse rotation of the rotor 10 in the actuator 2.

FIGS. 16(A) and 16(B) are diagrams for explaining reverse rotation of the rotor 10 in the actuator 2. These figures show drive pulses applied to the first to fourth electrodes of the actuator 2. These drive pulses are the same as shown in FIG. 3, and their cycle is denoted by T. In the actuator 2, when the rotor 10 rotates forward at a constant speed (usual times), the charged portions 12 sequentially move to the positions respectively facing the first to fourth electrodes which sequentially become positive as indicated by circles in FIG. 16(A), and receive attraction from them. In other words, in usual times, the rising edges of the drive pulses for the first to fourth electrodes indicated by circles are sequentially recognized, causing the rotor 10 to rotate forward.

However, on starting the rotor 10, more specifically, until the rotation gradually speeds up and becomes stable after starting the stationary rotor 10, even if the sets of fixed electrodes are sequentially energized, the charged portions 12 may not rotate to the positions facing these electrodes. For example, assume that the second and third electrodes are sequentially energized, but the rotor 10 cannot follow it and each charged portion 12 is placed between the first and second electrodes, and thereafter the fourth electrodes are energized. Then, since each charged portion 12 is closer to the backward fourth electrode than to the forward fourth electrode, the charged portions 12 receive backward attraction, thereby being attracted to the fourth electrodes. Further, assume that thereafter the first and second electrodes are sequentially energized, but the rotor 10 cannot follow it and each charged portion 12 is placed between the fourth and first electrodes, and thereafter the third electrodes are energized. Then, the charged portions 12 similarly receive backward attraction, thereby being attracted to the third electrodes. Continuation of this causes the rotor 10 to rotate backward.

As described above, if the rotor 10 has too large inertia to rotate according to the frequency of drive pulses, some of the rising edges to a positive potential appearing in the order of the first to fourth electrodes may not be recognized. For example, if the rising edges of the second and third electrodes are not recognized after the first electrodes become positive at time t0 shown in FIG. 16(B), the drive pulses will be recognized as if the fourth electrodes became positive next to the first electrodes. Similarly, if the subsequent rising edges of the first and second electrodes are not recognized, the drive pulses will be recognized as if the third electrodes became positive next to the fourth electrodes. Continuation of this has the same effect as applying drive pulses causing the fourth, third, second and first electrodes to become positive in this order as indicated by circles in FIG. 16(B), i.e., drive pulses for rotating the rotor backward, resulting in reverse rotation.

Figure 17:
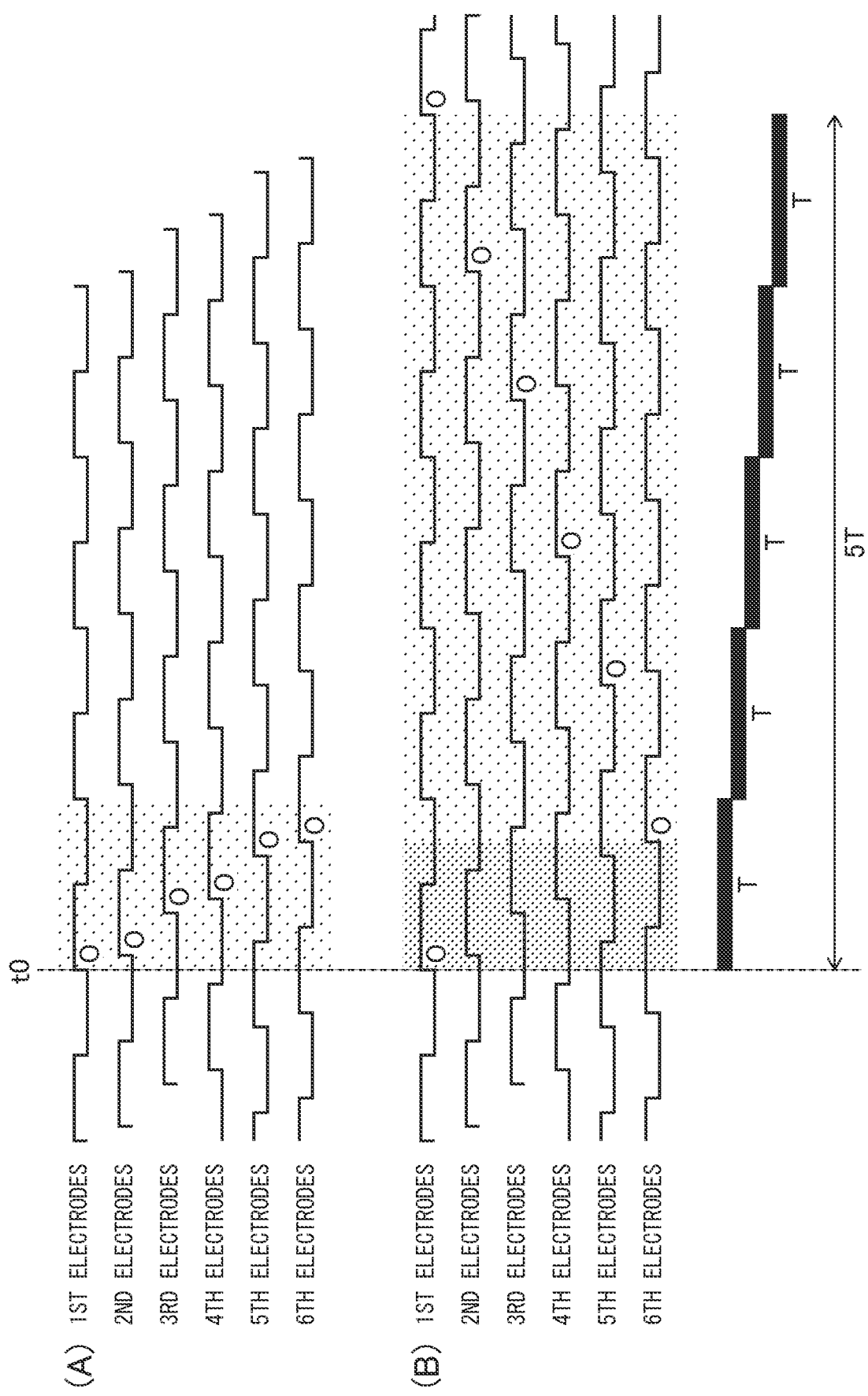
FIGS. 17(A) and 17(B) are diagrams for explaining reverse rotation of the rotor 10 in the actuator 2A.
Figure 18:
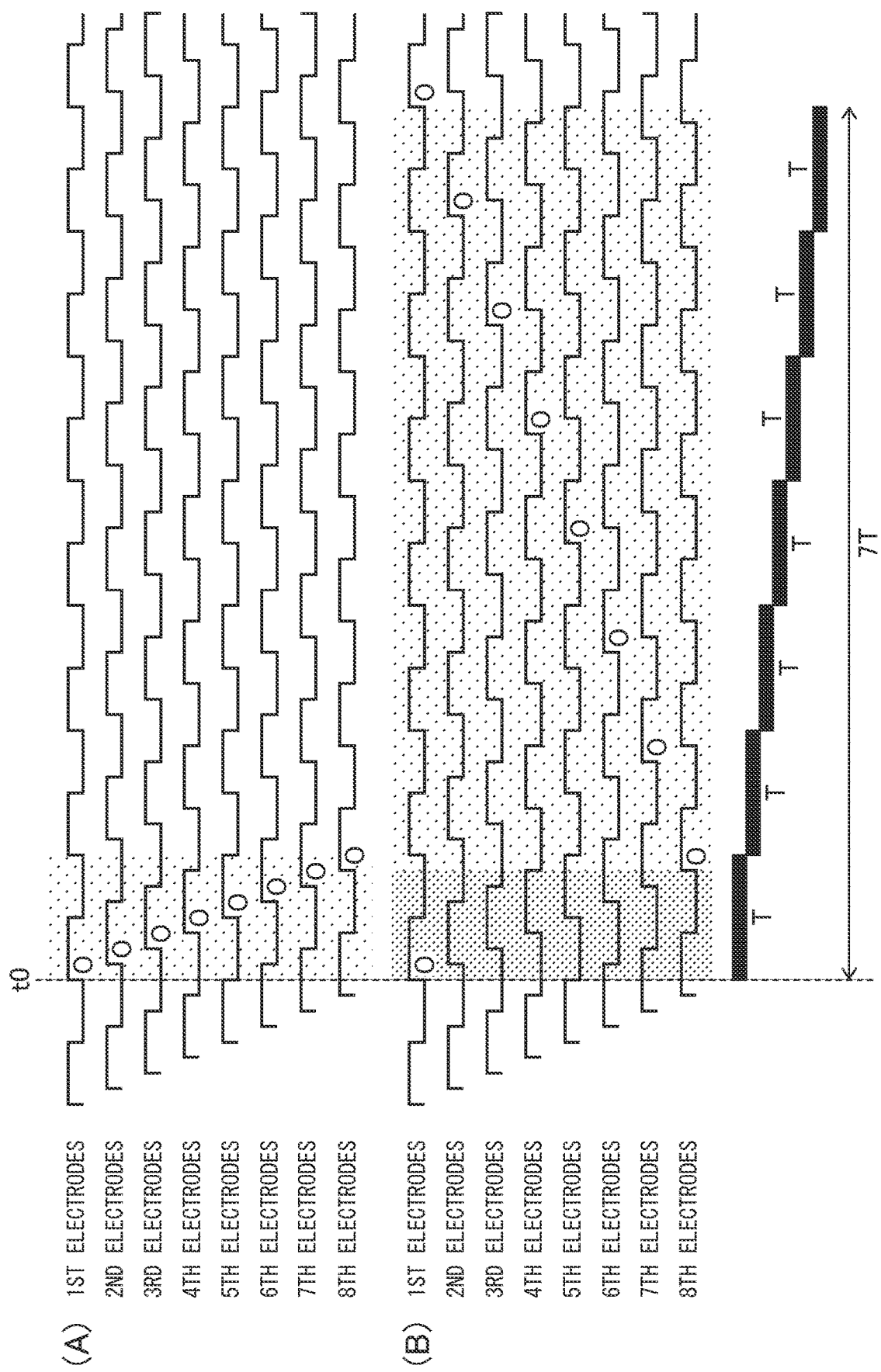
FIGS. 18(A) and 18(B) are diagrams for explaining reverse rotation of the rotor 10 in the actuator 2B.
Figure 19:
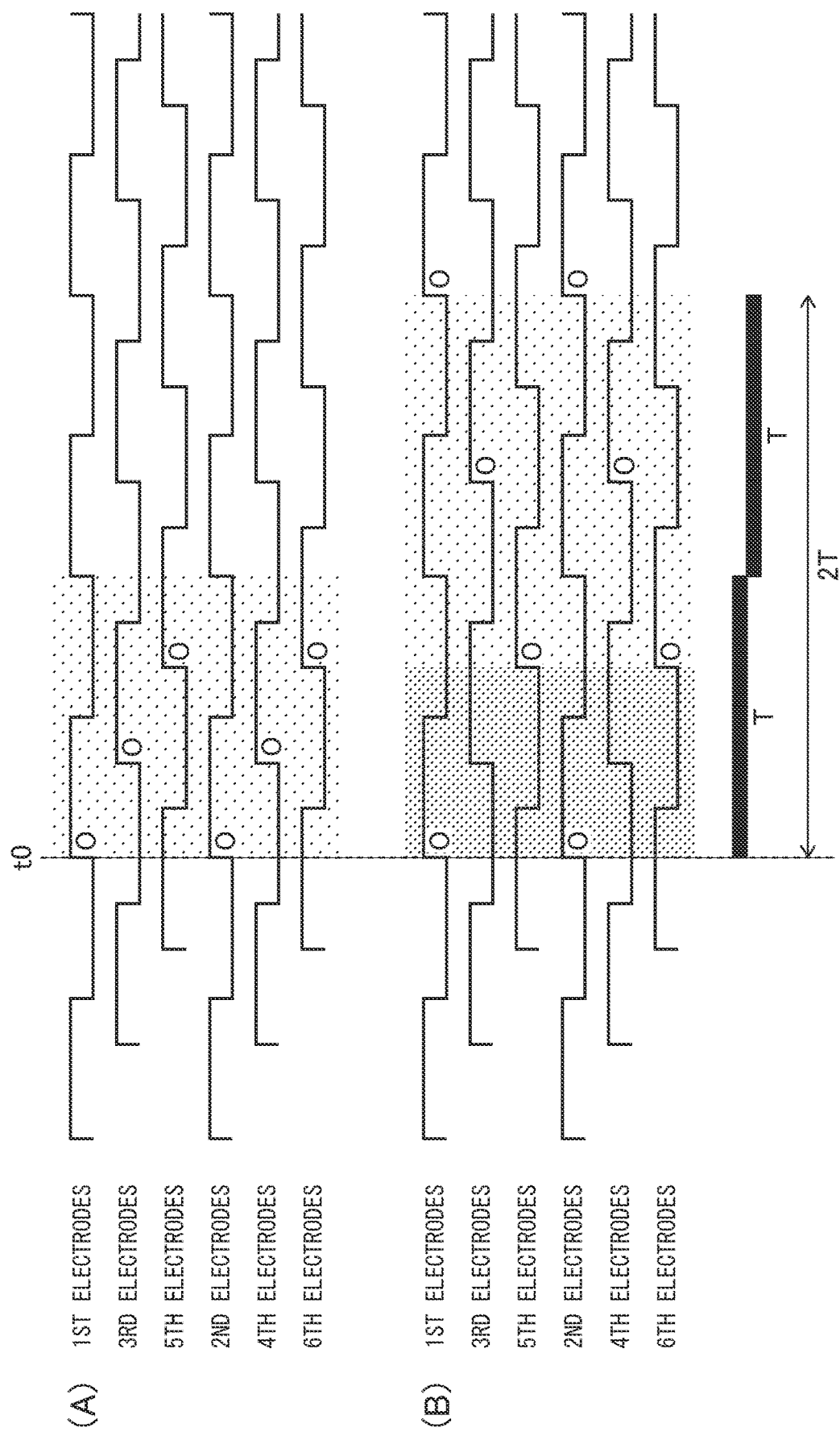
FIGS. 19(A) and 19(B) are diagrams for explaining reverse rotation of the rotor 10 in the actuator 2D.

FIGS. 17(A) and 17(B) are diagrams for explaining reverse rotation of the rotor 10 in the actuator 2A. FIGS. 18(A) and 18(B) are diagrams for explaining reverse rotation of the rotor 10 in the actuator 2B. FIGS. 19(A) and 19(B) are diagrams for explaining reverse rotation of the rotor 10 in the actuator 2D. These figures show the drive pulses applied to the first to sixth electrodes of the actuator 2A, the first to eighth electrodes of the actuator 2B, and the first to sixth electrodes of the actuator 2D, respectively. These drive pulses are the same as shown in FIGS. 6, 9 and 15(A), and their cycles are denoted by T.

In the actuators 2A, 2B, 2D also, in usual times, the rising edges of the drive pulses for the fixed electrodes indicated by circles in FIGS. 17(A), 18(A) and 19(A) are sequentially recognized, causing the rotor 10 to rotate forward. However, on starting the rotor 10 of the actuator 2A, for example, if a thinning phenomenon is repeated wherein after the first electrodes become positive at time t0 shown in FIG. 17(B) the rising edges of the second to fifth electrodes are not recognized but the subsequent rising edge of the sixth electrodes is recognized, this has the same effect as applying drive pulses for reverse rotation causing the sixth, fifth, fourth, third, second and first electrodes to become positive in this order as indicated by circles in FIG. 17(B). The same holds true for the drive pulses for the actuators 2B, 2D shown in FIGS. 18(B) and 19(B).

In order to eliminate the possibility of occurrence of such a phenomenon, the frequency of drive pulses (starting pulses) applied for at least first one cycle to the sets of fixed electrodes on starting the rotor 10 is preferably not more than ⅓ of the frequency of drive pulses applied during rotation of the rotor 10 (usual times). In other words, the frequency of the first pulses applied in the stationary state is preferably lower than that of the second and subsequent pulses, thereby slowly starting the rotor 10 to rotate. Since this prevents the above thinning phenomenon wherein the drive pulses are not partially recognized, continuation of reverse rotation can be surely prevented. Of course, the frequency of drive pulses may be ⅓-fold or lower for several cycles following the first one cycle, depending on the rotation speed of the rotor 10.

Taking the case of FIG. 3 as an example, force rotating backward the charged portions 12 placed near the first electrodes when the rotor 10 rotates too slowly to follow the driving of the fixed electrodes is the attraction from the fourth electrodes adjoining the first electrodes backward. Accordingly, in order to prevent reverse rotation of the rotor 10, it is necessary to lower the frequency of drive pulses to extend each period during which the corresponding fixed electrodes are energized, so that the charged portions 12 receive attraction not from the fourth electrodes but from the second electrodes, next to the first electrodes.

In the case of the actuator 2, setting the frequency of drive pulses at ⅓ or less of the frequency shown in FIG. 3 (i.e., setting the cycle at 3T or more) can prevent reverse rotation, since the rising edges of the drive pulses will not be recognized in the order of the fourth, third, second and first electrodes indicated by circles in FIG. 16(B). Similarly, in the cases of the actuators 2A, 2B, 2D, setting the frequencies of drive pulses at ⅕ or less, ⅐ or less, and ½ or less of the frequencies shown in FIGS. 6, 9 and 15(A) (i.e., setting the cycles at 5 T or more, 7 T or more, and 2 T or more) can prevent reverse rotation, respectively.

Generally speaking, in order to prevent the rotor 10 from failing to move according to the drive pulses and from rotating backward, the frequency of drive pulses applied for at least first one cycle may be not more than k (predetermined factor) times of the frequency of the usual drive pulses, where this factor k is the reciprocal of a number obtained by subtracting one from the number of rising edges to a positive potential in one cycle of the drive pulses. For example, for the actuator 2, since the drive pulses of FIG. 3 are of four phases, the number of rising edges in one cycle is four and the frequency of the starting drive pulses may be not more than $1/(4-1)=1/3$ of that of the usual drive pulses.

For the actuator 2A, since the drive pulses of FIG. 6 are of six phases, the number of rising edges in one cycle is six and the frequency of the starting drive pulses may be not more than $1/(6-1)=1/5$ of that of the usual drive pulses. For the actuator 2B, since the drive pulses of FIG. 9 are of eight phases, the number of rising edges in one cycle is eight and the frequency of the starting drive pulses may be not more than $1/(8-1)=1/7$ of that of the usual drive pulses. For the actuator 2C, since the drive pulses of FIG. 12 are of seven phases, the number of rising edges in one cycle is seven and the frequency of the starting drive pulses may be not more than $1/(7-1)=1/6$ of that of the usual drive pulses. For the actuator 2D, since the drive pulses of FIG. 15(A) are of three phases, the number of rising edges in one cycle is three and the frequency of the starting drive pulses may be not more than $1/(3-1)=1/2$ of that of the usual drive pulses.

Since the number of rising edges to a positive potential in one cycle of the drive pulses is the same as that of falling edges to a negative potential, the predetermined factor k of the frequency can be expressed as the reciprocal of a number obtained by subtracting one from the number of falling edges to a negative potential in one cycle of the drive pulses. Alternatively, the predetermined factor k can be expressed as the reciprocal of a number obtained by subtracting one from the number of out-of-phase drive pulses applied to the fixed electrodes on the stators 20, 30.

Since the actuator 2 includes the fewest sets of fixed electrodes, the minimum frequency which may cause reverse rotation is three times the frequency of drive pulses shown in FIG. 3. For example, in the case of the actuator 2A, unless the frequency of drive pulses reaches five times as large as shown in FIG. 6, the drive pulses are not recognized as reversing pulses which cause the sixth electrodes to become positive next to the first electrodes. More specifically, for the actuators 2A to 2C, which include more sets of fixed electrodes than the actuator 2, since the frequency which may cause reverse rotation is larger than three times the frequency of drive pulses shown in FIGS. 6, 9 and 12, reverse rotation does not easily occur. Thus, it is sufficient to lower the frequency of at least first one cycle of the starting pulses to not more than ⅓ of the frequency of the subsequent drive pulses. In order to reduce the diameter, fewer sets of fixed electrodes are preferable; even in the actuator 2, controlling the drive pulses in this way can surely prevent reverse rotation on startup.

Even in an one-sided-driving actuator wherein the charged portions and fixed electrodes are provided on one of the upper and lower surfaces of the rotor and on one of the stators facing the charged portions, respectively, drive pulses having a frequency not more than a product of a predetermined factor and the frequency of the usual drive pulses may be applied to the fixed electrodes for at least first one cycle on startup, where this factor is the reciprocal of a number obtained by subtracting one from the number of rising edges to a positive potential in one cycle of the drive pulses. This produces the same effect of preventing reverse rotation of the rotor, even in the case of one-sided driving.

Figure 20:
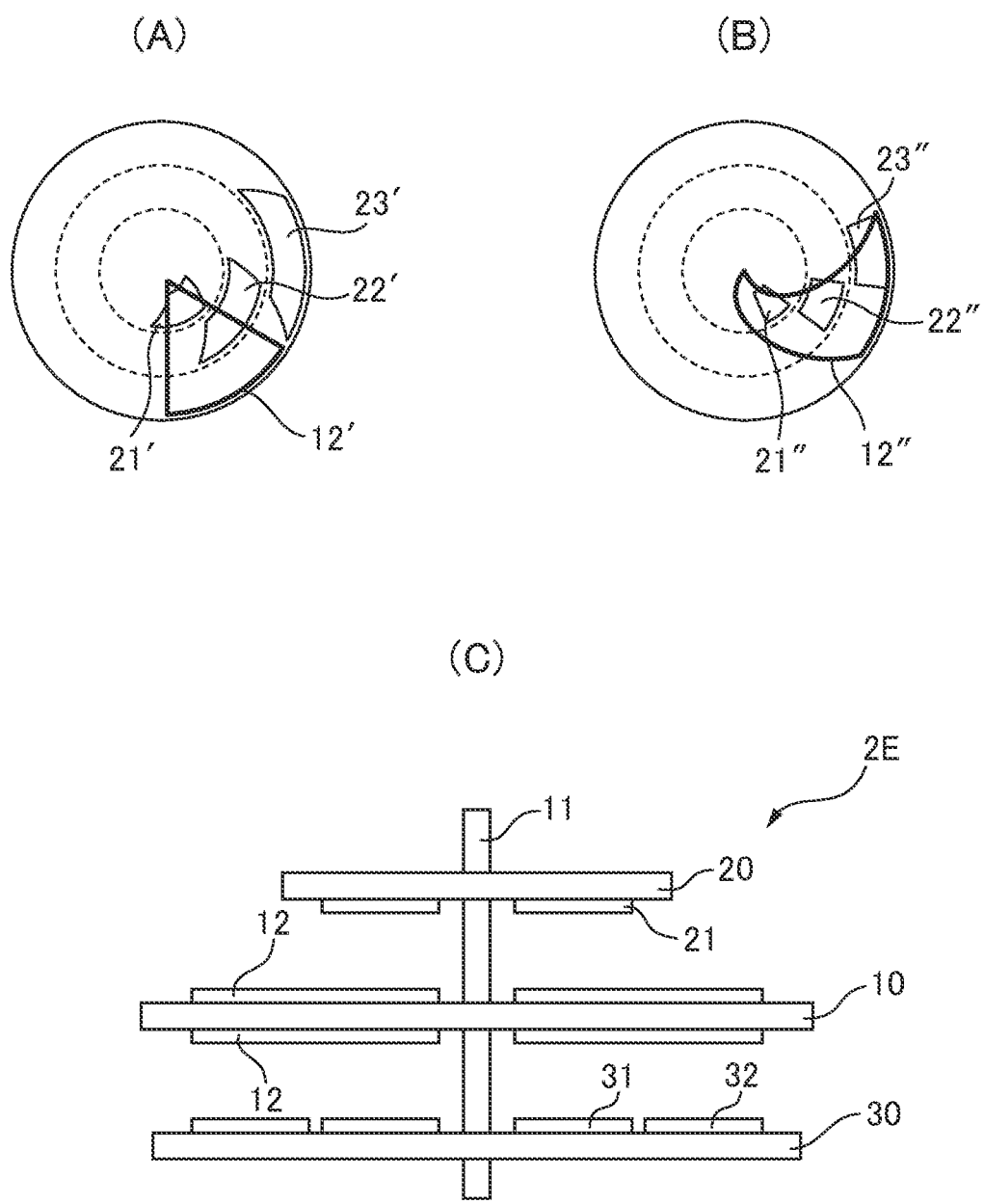
FIGS. 20(A) and 20(B) show examples of shapes of the charged portions and fixed electrodes.
FIG. 20(C) is a side view of an actuator 2E.

FIGS. 20(A) and 20(B) show examples of shapes of the charged portions and fixed electrodes. The charged portions and fixed electrodes provided on the rotor and stators are not limited to the substantially trapezoidal ones, but may have other shapes, such as a substantially square, rhombic or propeller shape. For example, as indicated by reference numerals 21' to 23' in FIG. 20(A), two sides of each fixed electrode may extend in the circumferential direction, while the other two sides may curve and extend obliquely with respect to the circle centered at the rotating shaft. In this case, as indicated by reference numeral 12' in FIG. 20(A), the radial sides of each charged portion may be orthogonal to the circle centered at the rotating shaft without inclining thereto.

As indicated by reference numerals 21″ to 23″ in FIG. 20(B), the fixed electrodes of each set may have a substantially square shape whose radial sides do not incline, and may be circumferentially displaced with each other in annular regions which are centered at the rotating shaft and located at different radial positions. In this case, as indicated by reference numeral 12″ in FIG. 20(B), each charged portion may have a substantially propeller shape whose radial sides curve and extend obliquely with respect to the circle centered at the rotating shaft. Such shapes also have the advantage of reducing fluctuations of drive torque, allowing for driving to rotate smoothly.

FIG. 20(C) is a side view of an actuator 2E. The stator 20 of the actuator 2E has a disk shape whose diameter is smaller than the diameters of the rotor 10 and stator 30. The stator 30 includes, on the upper surface thereof, fixed electrodes 31 on the inner side closer to the rotating shaft 11, and fixed electrodes 32 on the outer side further from the rotating shaft 11. The stator 20 includes, on the lower surface thereof, fixed electrodes 21 at the radial positions corresponding to the fixed electrodes 31 on the stator 30. Otherwise, the actuator 2E is identical in structure to the actuator 2. In any one of the actuators 2, 2A to 2D, the electrostatic motor 1 may have the same structure as the actuator 2E.

As in the actuator 2E of FIG. 20(C), the stators 20, 30 may not be equal in diameter, and one of them may have a disk shape whose diameter is smaller than that of the rotor 10. In other words, the rotor 10 may have a larger outer diameter than one of the stators. Alternatively, all of the rotor 10 and stators 20, 30 may have similar outer diameters, and the outer edge of the stator 20 or 30 may have a cut. Alternatively, part of the inner side of the stator 20 or 30 may be an opening; or some of the fixed electrodes on the inner side of the stator 20 or 30 may be partially removed and the base material of that portion may be transparent. In these cases, the rotor can be seen from the lateral side of the stator having a smaller outer diameter or through the cut, opening or transparent portion of the stator, which facilitates checking and adjusting the distance between the fixed electrodes and charged portions.

In general, the drive pulses for the electrostatic motor include pulses (starting pulses) applied on starting the rotor, and low-power pulses consuming less power than the starting pulses. The low-power pulses may alternately (e.g., half cycle each) have energizing periods during which some of the sets of fixed electrodes are energized, and non-energizing periods during which none of them is energized and the rotor is rotated by inertia. The drive pulses shown in FIGS. 3, 6, 9, 12 and 15(A) continuously change between positive and negative potentials and always make some of the sets of fixed electrodes be positive; thus, in the energizing periods, the charged portions 12 having negative charge are attracted to the positive electrodes, which restrains rotary motion. In contrast, in the non-energizing periods, all of the drive pulses applied to the sets of fixed electrodes may be set at high impedance to prevent attraction from the fixed electrodes, allowing the rotor 10 to continue rotating by inertia.

The drive pulses may be switched to the low-power pulses after starting the rotor, not only in a double-sided-driving actuator wherein the charged portions and fixed electrodes are provided on the upper and lower surfaces of the rotor and on the upper and lower stators facing the charged portions, respectively, but also in an one-sided-driving actuator wherein the charged portions and fixed electrodes are provided on one of the upper and lower surfaces of the rotor and on one of the stators facing the charged portions, respectively. This can reduce power consumption and restrain the battery voltage from dropping.

In order to further reduce power consumption of the actuator, the low-power pulses may cause only the fixed electrodes on one of the stators 20, 30 to be energized. If the drive pulses have non-energizing periods, stopping energizing causes the speed of the rotor 10 to fluctuate; however, if the fixed electrodes on only one of the stators are energized, the speed of the rotor 10 hardly fluctuates. In the latter case, the non-energized electrodes have positive charge in response to the negative charge of the charged portions 12, and receive attraction from the rotor 10, while the energized electrodes also receive attraction from the rotor 10 according to the drive pulses. Since this reduces frictional load of the rotor 10, the rotor 10 can be easily rotated even with drive torque obtained by energizing the fixed electrodes on only one of the stators. In short, the drive torque can be efficiently used as compared to the case of the one-sided driving where the charged portions 12 are provided on only one side of the rotor 10.

Once all of the fixed electrodes on the stators 20, 30 are set at high impedance, positive charge appears on the surfaces of the fixed electrodes on the stators 20, 30 in response to the negative charge of the charged portions 12, causing attraction to act between the fixed electrodes and charged portions 12 on the upper and lower surfaces of the rotor 10. Since this reduces frictional load of the rotor 10, applying drive pulses to the fixed electrodes on one of the stators in this state can easily rotate the rotor 10 with the same electric power as and less frictional load than in the case of the one-sided driving.

In particular, if the electrostatic motor is used as a hand-moving motor of a timepiece, the starting pulses correspond to drive pulses for continuously moving the second hand with a small pitch (hereinafter, referred to as sweep motion). The low-power pulses having non-energizing periods correspond to drive pulses for quivering the second hand (hereinafter, referred to as multi-beat motion). The multi-beat and sweep motions are distinguished as to whether the second hand seems to move smoothly.

In general, for use in an electronic appliance, such as a timepiece, it is desired to drive the electrostatic motor with as little power consumption as possible. Thus, the controller 4 may switch the drive pulses applied by the driver 3 from the starting pulses to the low-power pulses, after starting the rotor 10. Hereinafter, an electrostatic motor switching drive pulses will be described.

Figure 21:
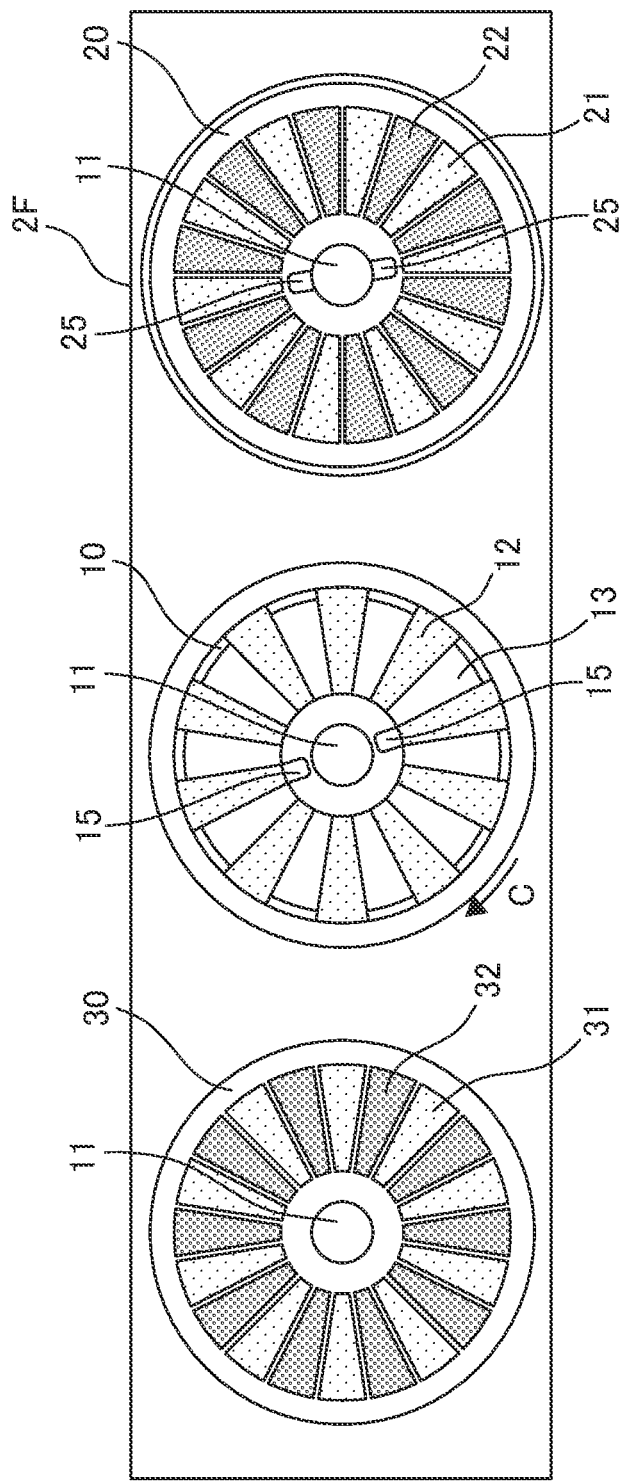
FIG. 21 is a diagram schematically illustrating an actuator 2F.

FIG. 21 is a diagram schematically illustrating an actuator 2F. The actuator 2F includes two detecting charged portions 15 on the upper surface of the rotor 10 near the hole into which the rotating shaft 11 is fitted, and two detecting electrodes 25 on the lower surface of the stator 20 near the similar hole for the rotating shaft 11. Otherwise, the actuator 2F is identical in structure to the actuator 2. The electrostatic motor 1 may include the actuator 2F instead of the actuator 2.

The detecting charged portions 15 and detecting electrodes 25 are an example of the detector detecting rotation of the rotor 10, and are provided separately from the charged portions 12 and fixed electrodes 21, 22. The detecting charged portions 15 and detecting electrodes 25 do not overlap the charged portions 12 and fixed electrodes 21, 22 as viewed from above, and are formed at the same radial position so as to face each other when they are circumferentially aligned by rotation of the rotor 10. If the holes for the rotating shaft 11 are not circular but have major and minor axes, the detecting charged portions 15 and detecting electrodes 25 are preferably disposed near the minor axes of those holes, in order to enlarge their areas as much as possible. Since the detecting electrodes 25 output detection signals whenever the detecting charged portions 15 pass through them by rotation of the rotor 10, the rotation speed of the rotor 10 can be detected based on the waveform of the detection signals (Z-phase detection).

The controller 4 of the electrostatic motor including the actuator 2F determines the rotational state of the rotor 10 based on an increase or decrease of the intervals between signals outputted from the detecting electrodes 25. For example, the controller 4 determines that the rotation speed of the rotor 10 has become constant and that the rotor 10 has been changed from a startup state to a stable state, if the detection signals are outputted from the detecting electrodes 25 at regular intervals about several tens of times. The controller 4 then switches the drive pulses outputted by the driver 3, from the starting pulses to the low-power pulses when it is determined that the rotation of the rotor 10 has been stabled based on the signals outputted from the detecting electrodes 25. For example, for use in a timepiece, the controller 4 switches the drive pulses for the sweep motion to those for the multi-beat motion. Alternatively, the controller 4 may switch between the sweep and multi-beat motions according to a user operation, for example.

Figure 22:
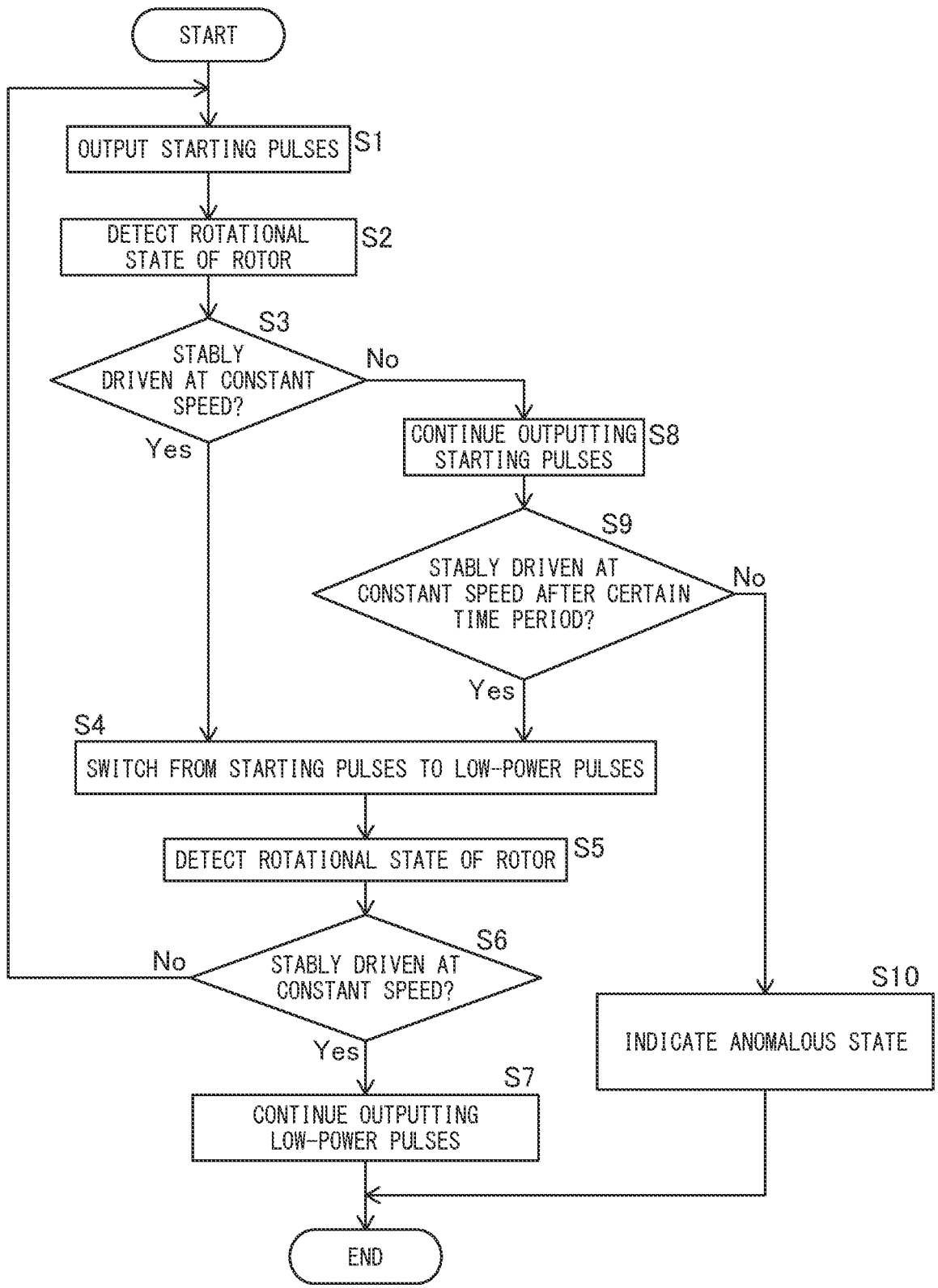
FIG. 22 is a flowchart showing an operational example of an electrostatic motor used for a timepiece and including the actuator 2F.

FIG. 22 is a flowchart showing an operational example of an electrostatic motor used for a timepiece and including the actuator 2F. The flow shown in FIG. 22 is executed by the CPU included in the controller 4 in accordance with a program previously stored in a ROM included in the controller 4.

First, the controller 4 causes the driver 3 to output the starting pulses (S1), and detects the rotational state of the rotor 10 based on the signals outputted from the detecting electrodes 25 (S2). If detection signals are outputted at regular intervals from the detecting electrodes 25 and the rotor 10 is stably driven at a constant speed (Yes in S3), the controller 4 switches the drive pulses outputted by the driver 3, from the starting pulses to the low-power pulses (S4). Then, the controller 4 detects the rotational state of the rotor 10 again, based on the output signals from the detecting electrodes 25 (S5). If the rotor 10 is stably driven at a constant speed (Yes in S6), the controller 4 causes the driving by the low-power pulses to continue (S7) and then terminates the process. If stable driving is not detected in S5 (No in S6), the process returns to S1 and the controller 4 causes the driver 3 to output the starting pulses again.

If stable driving is not detected in S2 (No in S3), the controller 4 causes the driving by the starting pulses to continue (S8). Then, after a certain time period, the controller 4 determines again whether the rotor 10 is stably driven at a constant speed (S9). If so (Yes in S9), the process goes to S4 and the controller 4 switches the drive pulses outputted by the driver 3, from the starting pulses to the low-power pulses. If stable driving is not detected (No in S9), an anomaly has occurred in rotation of the rotor 10. Thus, the controller 4 moves the second hand to a predetermined position, such as the 12-o'clock position, stops it there to indicate that anomalous state (S10), and then terminates the process.

After the rotation of the rotor is stabled, the electrostatic motor including the actuator 2F can be driven with less power consumption than on startup. Disposing the detecting charged portions 15 and detecting electrodes 25 near the holes for the rotating shaft 11 on the inner sides of the rotor 10 and stator 20 allows for detecting the rotational state of the rotor 10 without increasing its outer diameter.

Without the detecting charged portions 15 and detecting electrodes 25, the controller 4 may determine that the rotation of the rotor 10 has been stabled, after a certain time period from the starting of the rotor 10. One of the fixed electrodes 21 and one of the fixed electrodes 22 may be used for driving the rotor 10 and detecting its rotational state. In this case, the controller 4 may determine the rotational state of the rotor 10 and switch the drive pulses, based on out-of-phase detection signals outputted from these two electrodes (A-phase and B-phase detection signals) and a detection signal outputted from the detecting electrodes 25 for every revolution of the rotor 10 (Z-phase detection signal).

Alternatively, if the electrostatic motor is used as a hand-moving motor of a timepiece, the controller 4 may switch the drive pulses to the low-power pulses when the mode of the timepiece is changed to a clock-setting mode. Since the multi-beat motion makes the second hand quiver, switching the drive pulses to the low-power pulses for the multi-beat motion facilitates stopping the second hand at a good stopping point, such as a 12-o'clock position. Thus, the multi-beat motion has the advantage that the user can easily adjust the 0-second position at the time of clock-setting. Switching between the sweep and multi-beat motions based on the drive pulses also allows for informing the user that the operational mode of the timepiece has been switched.

Alternatively, the controller 4 may switch the drive pulses to the low-power pulses based on the battery voltage. For example, when the battery voltage is sufficiently high, the controller 4 may cause the hand to sweep with the starting pulses; when the battery voltage has decreased below a first threshold Th1, the controller 4 may alternately switch the drive pulses between the starting pulses and low-power pulses. In this case, for example, the controller 4 may switch between the sweep and multi-beat motions at certain intervals, or increase the ratio of the periods of the multi-beat motion as the battery voltage decreases. When the battery voltage has further decreased below a second threshold Th2 (<Th1), the controller 4 may permanently switch the drive pulses to the low-power pulses, so that the multi-beat motion continues. When the battery voltage has further decreased below a third threshold Th3 (<Th2), the controller 4 may control the drive pulses so that the second hand moves at a stroke every two seconds, for example.

Alternatively, if the electrostatic motor is used in an electronic appliance, such as a timepiece, including a power generator utilizing solar, electret or thermal power generation, for example, the controller 4 may switch the drive pulses to the low-power pulses based on the amount of electric power generated by the power generator. In this case, the controller 4 may switch between the sweep and multi-beat motions at certain intervals and change their durations, based on the amount of generated electric power.

The second hand may be repeatedly moved and stopped by the multi-beat motion so as to quiver, thereby informing the user of a change in state of the timepiece. For example, an unusual hand movement may be performed by applying drive pulses having a frequency several times larger than the usual drive pulses to the fixed electrodes to move the hand for a predetermined period and by stopping the rotor 10 to stop the hand during the next predetermined period. This allows for providing the user with a warning that the battery voltage is decreasing or information that the timepiece is in a setting mode, for example. In short, if warnings to the user should be given a high priority, drive pulses may be selected so that an unusual hand movement is performed by the multi-beat motion.

As a warning of charging arising from a decrease in battery voltage, hand movement (two-second movement) may be repeated wherein the second hand moves two divisions of the second indices at a stroke and stops for a while, thereby prompting the user to replace or charge the battery. The number of cycles of the drive pulses required for the second hand to move one division of the second indices, i.e., one-second interval depends on the axle ratio of gear trains of the hand and the number of circumferentially disposed electrodes on the stators. In order to achieve the two-second movement, it is sufficient to apply drive pulses of 2 n cycles in one second, where n denotes the number of cycles of the drive pulses required for the second hand to move one division of the second indices in the usual hand movement. More specifically, the two-second movement may be achieved by applying drive pulses having a frequency twice as large as usual for one second to quickly move the second hand two divisions and by stopping the rotor 10 for the next one second to stop the second hand. The frequency of drive pulses and how many divisions of the second indices the hand moves may be appropriately set.

In the above-described actuators, the first sets and second sets of fixed electrodes each include two to four sets of fixed electrodes, and the range of each of the charged portions 12 in the rotating direction of the rotor 10 overlaps two to eight of the sets of fixed electrodes. Further, the drive pulses cause the sets of electrodes to be positive in the order of their circumferential arrangement, which continuously generates forward torque. Thus, the rotor 10 can be started reliably to rotate forward, regardless of the positional relationship between the charged portions of the stationary rotor 10 and the fixed electrodes.

The invention claimed is:

1. An electrostatic motor comprising:
a rotor rotatable around a rotating shaft;
charged portions formed radially around the rotating shaft on upper and lower surfaces of the rotor;
first and second stators disposed to sandwich the rotor therebetween; and
first sets and second sets of fixed electrodes respectively formed radially around the rotating shaft on the surfaces of the first and second stators facing the rotor, the first sets and second sets of fixed electrodes selectively energized according to drive pulses to rotate the rotor by electrostatic force generated between the charged portions and the fixed electrodes, wherein
the average number of sets of fixed electrodes simultaneously energized in one cycle of the drive pulses out of the first sets and second sets of fixed electrodes is equal to the average of the numbers of first sets and second sets of fixed electrodes, and
one set of electrodes out of the first sets of fixed electrodes and one set of electrodes out of the second sets of fixed electrodes are always energized simultaneously during all periods of one cycle.

2. The electrostatic motor according to claim 1, wherein
on starting the rotor, the first sets and second sets of fixed electrodes are supplied for at least first one cycle with drive pulses having a frequency not more than a product of a predetermined factor and the frequency of drive pulses applied during rotation of the rotor, and
the predetermined factor is the reciprocal of a number obtained by subtracting one from the number of rising edges to a positive potential in one cycle of the drive pulses.

3. The electrostatic motor according to claim 1, wherein
the first sets and second sets of fixed electrodes each comprise two to four sets of fixed electrodes, and
the range of each of the charged portions in the rotating direction of the rotor overlaps two to eight fixed electrodes out of the first sets and second sets of fixed electrodes.

4. The electrostatic motor according to claim 1, wherein the first sets and second sets of fixed electrodes are equal in number and displaced out of phase with each other in the rotating direction of the rotor.

5. The electrostatic motor according to claim 1, wherein the first sets and second sets of fixed electrodes differ in number.

6. The electrostatic motor according to claim 5, wherein
the first sets and second sets of fixed electrodes are concentrically disposed around the rotating shaft, and
at least part of one of the first and second stators has a smaller outer diameter than the rotor.

7. The electrostatic motor according to, claim 1 further comprising:
a driver applying the drive pulses to the first sets and second sets of fixed electrodes; and
a controller switching the drive pulses after starting the rotor from starting pulses applied on starting the rotor to low-power pulses consuming less power than the starting pulses.

8. The electrostatic motor according to claim 7, further comprising a detector detecting rotation of the rotor, wherein
the controller switches the drive pulses from the starting pulses to the low-power pulses when it is determined that the rotation of the rotor has been stabled based on a detection result by the detector.

9. The electrostatic motor according to claim 7, wherein the low-power pulses have energizing periods during which some of the first sets and second sets of fixed electrodes are energized, and non-energizing periods during which none of the first sets and second sets of fixed electrodes is energized and the rotor is rotated by inertia.

10. The electrostatic motor according to claim 7, wherein the low-power pulses cause only one of the first sets and second sets of fixed electrodes to be energized.

* * * * *